(12) United States Patent
Pruessmeier et al.

(10) Patent No.: US 10,496,075 B2
(45) Date of Patent: Dec. 3, 2019

(54) CONTROL OF AN AUTOMATION PROCESS VIA A DATA NETWORK

(71) Applicant: BECKHOFF AUTOMATION GMBH, Verl (DE)

(72) Inventors: Uwe Pruessmeier, Lemgo (DE); Dirk Janssen, Verl (DE)

(73) Assignee: Beckhoff Automation GmbH, Verl (DE)

( * ) Notice: Subject to any disclaimer, the term of this patent is extended or adjusted under 35 U.S.C. 154(b) by 46 days.

(21) Appl. No.: 15/958,472

(22) Filed: Apr. 20, 2018

(65) Prior Publication Data

US 2018/0307204 A1 Oct. 25, 2018

(30) Foreign Application Priority Data

Apr. 21, 2017 (DE) .......................... 10 2017 108 578

(51) Int. Cl.
*G05B 19/408* (2006.01)
*G05B 19/4155* (2006.01)
*G06F 13/10* (2006.01)
*G05B 19/418* (2006.01)

(52) U.S. Cl.
CPC ..... *G05B 19/4083* (2013.01); *G05B 19/4155* (2013.01); *G05B 19/4186* (2013.01); *G06F 13/102* (2013.01)

(58) Field of Classification Search
CPC ............ G05B 19/4083; G05B 19/4186; G05B 19/4155; G06F 13/102
See application file for complete search history.

(56) References Cited

U.S. PATENT DOCUMENTS 8,943,237 B1 * 1/2015 Lin ....................... G06F 13/385
710/20
2014/0269255 A1  9/2014 Zeng et al.

* cited by examiner

*Primary Examiner* — Walter J Divito
(74) *Attorney, Agent, or Firm* — Dorsey & Whitney LLP

(57) ABSTRACT

A network module is specified for controlling an automation process via a data network with superordinate and subordinate data paths. The network module is configured to successively receive, during a communication cycle, via the superordinate data path, a first portion of a sum total of first output data transmitted to signal units connected to a first subordinate data path, a first portion of a sum total of second output data transmitted to signal units connected to a second subordinate data path, a second portion of the first output data and a second portion of the second output data. The network module is configured to send the first and second portions of the first output data immediately subsequently to one another via the first subordinate data path and the first and second portions of the second output data immediately subsequently to one another via the second subordinate data path.

23 Claims, 11 Drawing Sheets

CONTROL OF AN AUTOMATION PROCESS VIA A DATA NETWORK

CROSS-REFERENCE TO RELATED APPLICATION

This application claims priority to German Patent Application DE 10 2017 108 578.5, filed Apr. 21, 2017 and entitled STEUERN EINES AUTOMATISIERUNGSPROZESSES ÜBER EIN DATENNETZWERK, which is incorporated by reference herein, in the entirety and for all purposes.

FIELD

The invention relates to a method for controlling an automation process via a data network of a control system, to a control system for controlling an automation process via a data network and to a network module for a control system for controlling an automation process via a data network.

BACKGROUND

Control systems having data networks are used inter alia in automation engineering for controlling automation processes. In this case, the data network connects a control device of the control plane to signal units of the sensor/actuator plane or field plane. The signal units normally have inputs for connecting sensors via which input signals can be read in that characterize the state of the automation process. Such state signals can represent a position or speed of machine parts, a position of a switch, a pressure or a temperature. Alternatively or additionally, the signal units have outputs for connecting actuators via which output signals can be output to the automation process in order to alter the state of the automation process. Such actuators may be motors, valves or heating elements, for example.

In the signal units, the input signals are converted into input data and the input data are subsequently transmitted to the control device via the data network. The control device evaluates the input data in order to determine the state of the automation process to be controlled, and takes the input data as a basis for generating output data in order to influence the automation process in a desired manner. The output data are transmitted to the signal units via the data network, and the signal units take the output data as a basis for outputting the output signals to the actuators.

The control of the automation process is normally effected in successive control cycles. During a control cycle, output data are computed in the control device and provided for output to the automation process. Subsequently, the output data are transmitted from the control device to the signal units via the data network and input data are transmitted from the signal units to the control device via the data network. In a subsequent control cycle, the input data are used for computing new output data in the control device, while the signal units take the output data as a basis for outputting the output signals.

The computation of the output data in the control device, and the reading-in of the input signals and the output of the output signals in the signal units, are normally effected during a computation cycle of the control cycle, while the transmission of the output data and the transmission of the input data via the data network are effected during a communication cycle of the control cycle. The duration of the control cycle determines how quickly it is possible to react to state changes for the automation process. The duration or cycle time of the control cycle is inter alia determined by the time that is needed for executing the communication cycle, that is to say for the data transmission of the output data from the control device to the signal units and for the data transmission of the input data from the signal units to the control device. For the data transmission, the time that elapses between data in the transmitter being transmitted and the data being received in the predetermined receiver is also referred to as the latency of the data transmission.

The latency of the data transmission substantially determines the cycle time of the automation process control and hence the speed at which it is possible to react to status changes for the automation process. The shorter the cycle time or the lower the latency, the more quickly the outputs of the control system can be updated and the more accurately the automation process can be controlled.

The latency of the data transmission via the data network is dependent inter alia on the number of network components through which the data sent via the data network need to pass on their way between transmitter and receiver. Additionally, the network components themselves can contribute to increasing the latency, for example if they first of all process directed data, buffer-store them or convert them between different data or protocol formats.

A low latency is in particular needed for controlling automation processes in which control loops are completed via the data network. This is in particular the case for drives in which a mobile element of the drive, for example a rotor of an electric motor, is moved by means of an actuator connected to a signal unit of the control system and the position of the mobile element is regulated by the control device on the basis of position data that are obtained from another signal unit of the control system. In such systems, the latency of the data transmission on the data network can substantially determine the possible bandwidth of the control loop.

SUMMARY

It is an object of the present invention to specify a method for controlling an automation process via a data network, a control system for controlling an automation process via a data network and a network module for a control system for controlling an automation process via a data network.

This object is achieved by a method, a control system and a network module according to the independent claims. Developments are specified in each of the dependent claims.

EXAMPLES

A method is specified for controlling an automation process via a data network of a control system, wherein the control system comprises a control device, a network module connected to the control device via a superordinate data path and signal units connected to the network module via subordinate data paths. In this case, the sum of the transmission rates on the subordinate data paths corresponds to no more than the transmission rate on the superordinate data path, and the subordinate data paths comprise at least a first subordinate data path and a second subordinate data path. The method comprises successive control cycles that each comprise a computation cycle and a communication cycle. The computation cycle comprises providing in the control device a sum total of first output data transmitted in the communication cycle from the control device to the signal units connected to the first subordinate data path, and providing in the control device a sum total of second output data transmitted in the communication cycle from the control device to the signal units connected to the second subordinate data path. The communication cycle comprises splitting the first output data into at least a first portion and a second portion in the control device, splitting the second output data into at least a first portion and a second portion in the control device, transmitting the first portion of the first output data from the control device to the network module via the superordinate data path, transmitting the first portion of the second output data from the control device to the network module via the superordinate data path after the transmission of the first portion of the first output data, transmitting the second portion of the first output data from the control device to the network module via the superordinate data path after the transmission of the first portion of the second output data, and transmitting the second portion of the second output data from the control device to the network module via the superordinate data path after the transmission of the second portion of the first output data. The communication cycle further comprises the network module sending the first portion of the first output data via the first subordinate data path, the network module sending the first portion of the second output data via the second subordinate data path, the network module sending the second portion of the first output data via the first subordinate data path and the network module sending the second portion of the second output data via the second subordinate data path.

By virtue of the first portions of the first and second output data being transmitted from the control device to the network module first, the sending of the first portions of the output data via the subordinate data paths can already be begun in each case while the second portions of the first and second output data are still being transmitted on the superordinate data path from the control device to the network module. In contrast to a method in which first of all the sum total of first output data and only subsequently the sum total of second output data are transmitted via the superordinate data path, it is thus not necessary to wait until the sum total of first output data has been transmitted to the network module before the sending of the second output data via the second subordinate data path is begun. This reduces the time needed overall for transmitting the first and second output data from the control device to the signal units and hence for the communication cycle.

Since the sum of the data transmission rates on the subordinate data paths corresponds to no more than the sum of the transmission rate on the superordinate data path, it is possible to ensure that during the sending of the first portions of the output data on the subordinate data paths a sufficient quantity of output data is transmitted via the superordinate data path in order to be able to continue sending the second portions of the first and second output data immediately subsequently to the sending of the first portions.

The first portion and the second portion of the first output data, and the first portion and the second portion of the second output data, may be of equal magnitude in each case. It is also possible for the first portion of the first output data and the first portion of the second output data, and the second portion of the first output data and the second portion of the second output data, to be of equal magnitude in each case, in particular if the data transmission rates on the first subordinate data path and the second subordinate data path are of equal magnitude. The first portion of the first output data and the first portion of the second output data, and the second portion of the first output data and the second portion of the second output data, may also be of different magnitude in each case. Generally, the ratio of the magnitude of the first portion of the first output data to the magnitude of the first portion of the second output data and the ratio of the magnitude of the second portion of the first output data to the magnitude of the second portion of the second output data can correspond to the ratio of the transmission rate on the first subordinate data path to the transmission rate on the second subordinate data path.

The computation cycle and the communication cycle of the control cycle can be executed successively, in particular immediately subsequently to one another. The computation cycle and the communication cycle can alternatively overlap in time, in particular steps of the communication cycle can already be executed before all the steps of the computation cycle are complete.

The provision of the first output data and the provision of the second output data can be effected successively or at least in a manner overlapping in time or at the same time. Equally, the splitting of the first output data and the splitting of the second output data can be effected successively or at least in a manner overlapping in time or at the same time. The sending of the first portion of the first output data and the sending of the first portion of the second output data, and the sending of the second portion of the first output data and of the second portion of the second output data, can be effected successively in each case. It is alternatively possible for the sending of the first portion of the first output data and the sending of the first portion of the second output data to be effected at least in a manner overlapping in time, in particular at the same time, which allows a particularly short duration of the communication cycle.

In a development of the method, the sending of the first portion of the second output data via the second subordinate data path is begun before the end of the transmission of the second portion of the first output data via the superordinate data path. The sending of the second output data via the second subordinate data path is thus begun while portions of the first output data are still being transmitted via the superordinate data path. This allows the total duration of the communication cycle to be kept particularly short.

In a development of the method, the first portion of the first output data and the first portion of the second output data are transmitted from the control device to the network module in a first data packet of the superordinate data path, and the second portion of the first output data and the second portion of the second output data are transmitted from the control device to the network module in a second data packet of the superordinate data path.

This allows the sending of the first portions of the first and second output data via the subordinate data paths to be begun no later than after the complete reception of the first data packet. In particular, the transmission of the output data via the superordinate data path can be secured using a check value included in the data packets and the check value can be checked before the sending of the first portions of the first and second output data via the subordinate data paths in order to ensure undistorted reception of the first portions of the output data.

The transmission rate on the superordinate data path may be higher than the sum of the transmission rates on the subordinate data paths. In such a case, the transmission of the data packets with the first and second portions of the output data on the superordinate data path requires less time than the sending of the first and second portions of the output data on the subordinate data paths. Hence, the data packets sent on the superordinate data path do not have to be directly subsequent to one another and there remains time between the transmission of the first and second data packets for a data interchange of other data, for example with further units connected to the superordinate data path.

In a development of the method, the sending of the second portion of the first output data via the first subordinate data path is effected immediately subsequently to the sending of the first portion of the first output data, and the sending of the second portion of the second output data via the second subordinate data path is effected immediately subsequently to the sending of the first portion of the second output data. As a result, the sending of the output data via the subordinate, slower data paths requires particularly little time and the duration of the communication cycle is reduced.

In a development of the method, the sending of the first portion of the first output data via the first subordinate data path is effected as a first section of a first data message for the first subordinate data path, and the sending of the second portion of the first output data via the first subordinate data path is effected as a second section of the first data message. Moreover, the sending of the first portion of the second output data via the second subordinate data path is effected as a first section of a second data message for the second subordinate data path and the sending of the second portion of the second output data via the second subordinate data path is effected as a second section of the second data message.

As a result, the subordinate data paths can in particular be configured as field buses, as are widely used in automation engineering. Such field buses are EtherCAT, Profibus, AS-Interface or Interbus, for example. In a configuration of the subordinate data paths as field buses, a multiplicity of signal units from different manufacturers can be incorporated into the control system, as a result of which the control system can be used particularly flexibly.

In a development of the method, the communication cycle comprises transmitting a first initial sequence from the control device to the network module via the superordinate data path, transmitting a second initial sequence from the control device to the network module via the superordinate data path, sending the first initial sequence as part of the first data message before sending the first portion of the first output data via the first subordinate data path, and sending the second initial sequence as part of the second data message before sending the first portion of the second output data via the second subordinate data path.

As a result, the initial sequence of the data message, for example a "header" of the data message, can be produced in the control device itself. The initial sequence can comprise information about the transmitter, the receiver or the data format of the data message, for example. The initial sequence can inter alia be used to establish to which signal unit the data message is addressed and via which subordinate data path the data message is to be transmitted.

In a development of the method, the first portion of the first output data is marked with a first piece of address information during the splitting of the first output data and the first portion of the second output data is marked with a second piece of address information during the splitting of the second output data. Moreover, the communication cycle comprises assigning the first portion of the first output data for the sending via the first subordinate data path on the basis of the first piece of address information in the network module and assigning the first portion of the second output data for the sending via the second subordinate data path on the basis of the second piece of address information in the network module.

This allows the network module to easily assign, after the reception via the superordinate data path, the portions of the first output data to the first subordinate data path and the portions of the second output data to the second subordinate data path. The address information may be configured as a datum placed in front of the respective portions during the transmission via the superordinate data path, for example.

In a development of the method, the first and second pieces of address information are formed by a position of the first portions of the first and second output data within a data packet of the superordinate data path that is transmitted via the superordinate data path.

By way of example, the first and second portions of the first and second output data can each have a stipulated length or volume of data that is stored in the network module. The first portion of the first output data can then consist of a first section of stipulated length and the first portion of the second output data can consist of a second section of stipulated length within the data packet. This allows particularly simple assignment of the output data to the subordinate data paths. Moreover, marking the assignment to the subordinate data paths requires no additional data to be transmitted on the superordinate data path, which means that the utilization level of the superordinate data path can be kept low.

In a development of the method, the computation cycle comprises computing a first piece of check information on the basis of the sum total of the first output data in the control device and computing a second piece of check information on the basis of the sum total of the second output data in the control device. Moreover, the communication cycle comprises transmitting the first piece of check information to the network module via the superordinate data path, sending the first piece of check information via the first subordinate data path for checking by the signal units connected to the first subordinate data path, transmitting the second piece of check information to the network module via the superordinate data path and sending the second piece of check information via the second subordinate data path for checking by the signal units connected to the second subordinate data path.

This allows a distortion or a loss of the output data in the signal units to be detected in a simple manner. The check information can in particular be computed and added to the output data before the output data are split into the first and second portions. The check information can in particular be used to detect a distortion or a loss of one of the portions of the first and second output data on the superordinate data path, so that suitable countermeasures such as fresh transmission or shutdown of the automation process can be taken. In particular in cases in which the first portions of the first and second output data and the second portions of the first and second output data are each transmitted in separate data packets of the superordinate data path and these data packets are each secured only in themselves using a check value, a piece of check information computed before the output data are split allows interference on the superordinate data path to be detected in a simple manner.

In a development of the method, the transmission of the first portion of the first output data via the superordinate data path is begun before the provision of the sum total of the output data to be transmitted in the communication cycle in the control device has been finished. In particular, the computation cycle and the communication cycle can overlap in time. As a result, the time required for the control cycle can be kept particularly short, since a portion of the output data is already sent while the remaining portion of the output data is still being generated or computed.

In a development of the method, the communication cycle comprises the network module receiving via the first subordinate data path a first portion of a sum total of first input data transmitted in the communication cycle from the signal units connected to the first subordinate data path to the control device, the network module receiving via the second subordinate data path a first portion of a sum total of second input data transmitted in the communication cycle from the signal units connected to the second subordinate data path to the control device, transmitting the first portion of the first input data from the network module to the control device via the superordinate data path and transmitting the first portion of the second input data from the network module to the control device via the superordinate data path. Moreover, the communication cycle comprises the network module receiving a second portion of the first input data via the first subordinate data path, the network module receiving a second portion of the second input data via the second subordinate data path, transmitting the second portion of the first input data from the network module to the control device via the superordinate data path after the transmission of the first portions of the first and second input data and transmitting the second portion of the second input data from the network module to the control device via the superordinate data path after the transmission of the first portions of the first and second input data.

By virtue of first of all the first portions of the first and second input data and only subsequently the second portions of the first and second input data being transmitted from the network module to the control device via the superordinate data path, the transmission of the first portions of the first and second input data via the superordinate data path can already be begun before the reception of the second portions of the first and second input data or the reception of the sum total of the first and second input data via the subordinate data paths are complete. This reduces the time required for the communication cycle in comparison with a method in which the first and second input data are not transmitted via the superordinate data path until after they have been completely received via the subordinate data paths.

The reception of the first portions of the first and second input data can be effected at least partly at the same time. The reception of the second portions of the first and second input data can likewise be effected at least partly at the same time, in particular at the same time. The reception of the second portions of the first and second input data is effected on the respective subordinate data path after the reception of the first portions of the first and second input data on the respective subordinate data path. The transmission of the first portions of the first and/or second input data via the superordinate data path can be effected at least partly at the same time, in particular at the same time, as the reception of the second portions of the first and/or second input data via the subordinate data paths.

In a development of the method, the first portion of the first input data and the first portion of the second input data are transmitted in a data packet of the superordinate data path and the second portion of the first input data and the second portion of the second input data are transmitted in a further data packet of the superordinate data path. As a result, it is a simple matter to transmit the first portions of the first and second input data before the second portions thereof.

In a development of the method, the transmission of the input data is begun as soon as a stipulated volume of data for input data has been received by the network module via the subordinate data paths. The stipulated volume of data can easily be used to prescribe the magnitude of the first and second portions of the input data. By way of example, the stipulated magnitude may be proportioned such that the superordinate data path is utilized to an optimum degree. By way of example, the magnitude may be stipulated such that the ratio of control data to useful data on the superordinate data path is optimum. In this case, control data are those data that, according to the transmission protocol used on the superordinate data path, need to be added to the useful data, which comprise the actual input data. The control data can in particular comprise an address, a designation for the format or for the type of data packet or a check value.

In a development of the method, the communication cycle comprises providing the first output data and the second output data with a piece of time information in the network module in order to synchronize the signal units of the first subordinate data path and the signal units of the second subordinate data path to a common time base.

The time information can be used in particular to prescribe for signal units that are connected to different subordinate field buses the same time for output of the output data to the automation process. The superordinate data path may in particular be a nondeterministic bus system, in which bus access by individual bus subscribers cannot be guaranteed at times having stipulated timing. In nondeterministic bus systems of this kind, synchronization of the connected signal units via the superordinate data path is normally not possible. By contrast, the subordinate data paths may be configured as deterministic, in particular as real-time compatible deterministic, bus systems that allow synchronization of connected signal units via the subordinate data paths. The time information added in the network module can be used to synchronize signal units connected to separate subordinate data paths even in such data networks.

In a development of the method, the communication cycle comprises matching the piece of time information to a further piece of time information of a further network module of the control system. By way of example, the pieces of time information can be matched such that the signal units connected to the network module and the signal units connected to the further network module have the same piece of time information prescribed for them or that the signal units each output the output data to the automation process at the same time. This allows multiple network modules to be used in the control system and at the same time all the signal units to be synchronized to one another. In particular, the piece of time information and the further piece of time information may be identical.

In a development of the method, the sum total of the first output data is split into a plurality of portions during the communication cycle and the sum total of the second output data is split into a plurality of portions during the communication cycle. During the communication cycle one of the portions of the first output data and one of the portions of the second output data are successively transmitted, in each case alternately, from the control device to the network module via the superordinate data path. Moreover, during the communication cycle the portions of the first output data are successively sent from the network module via the first subordinate data path and the portions of the second output data are successively sent from the network module via the second subordinate data path.

This allows portions of the first and second output data to already be sent via the subordinate data paths while other portions of both the first and the second output data are still being transmitted via the superordinate data path. This reduces overall the latency of the data transmission via the data network.

In a development of the method, the signal units are connected to the network module via a plurality of subordinate data paths and during the computation cycle all the respective output data to be transmitted to the signal units of the relevant subordinate data path in the control cycle are provided in the control device for each of the subordinate data paths. Moreover, during the communication cycle the output data provided for each of the individual subordinate data paths are each split into a plurality of portions. Moreover, during the communication cycle a respective one of the portions of the output data provided for each of the individual subordinate data paths is successively transmitted from the control device to the network module via the superordinate data path and the transmission of a respective one of the portions of the output data provided for each of the individual subordinate data paths from the control device to the network module via the superordinate data path is repeated until all the portions of the output data are transmitted.

This allows portions of the output data intended for the relevant data path to already be sent on each of the subordinate data paths while other portions of the output data intended for the relevant subordinate data path are still being transmitted for each of the subordinate data paths via the superordinate data path. This reduces overall the latency of the data transmission via the data network.

A control system for controlling an automation process via a data network has a control device, a network module and signal units, wherein the network module is connectable to the control device via a superordinate data path of the data network and the network module is connectable to the signal units via subordinate data paths of the data network. The sum of the transmission rates on the subordinate data paths corresponds to no more than the transmission rate on the superordinate data path and the subordinate data paths comprise at least a first subordinate data path and a second subordinate data path. The control device comprises a processing module, a splitting module and a transmission module, wherein the network module comprises an assignment module and a communication module. The control device is configured to control the automation process in successive control cycles, wherein each of the control cycles comprises a computation cycle and a communication cycle. The processing module is configured to compute and provide, during the computation cycle, a sum total of first output data transmitted in the communication cycle from the control device to the signal units connected to the first subordinate data path and a sum total of second output data transmitted in the communication cycle from the control device to the signal units connected to the second subordinate data path. The splitting module is configured to split, during the communication cycle, the first output data into a first portion and into a second portion and the second output data into a first portion and into a second portion. The transmission module is configured to transmit, during the communication cycle, first the first portion of the first output data, subsequently the first portion of the second output data, subsequently the second portion of the first output data and subsequently the second portion of the second output data to the network module via the superordinate data path. The assignment module is configured to assign the first portion of the first output data to the first subordinate data path and the first portion of the second output data to the second subordinate data path. The communication module is configured to send the first portion of the first output data via the first subordinate data path and the first portion of the second output data via the second subordinate data path. The assignment module is configured to assign the second portion of the first output data to the first subordinate data path and the second portion of the second output data to the second subordinate data path. The communication module is configured to send the second portion of the first output data via the first subordinate data path immediately subsequently to the first portion of the first output data, and the second portion of the second output data via the second subordinate data path immediately subsequently to the first portion of the second output data.

In a development of the control system, the control device and the network module are arranged in a common housing composite (or component), wherein the superordinate data path is configured as an internal data bus within the housing composite, in particular as a Peripheral Component Interconnect (PCI) Express bus. This allows particularly fast transmission of the output data and the input data via the superordinate data path. In particular, the housing composite may be configured as a computer (PC), for example as an industrial PC, and the network module may be configured as a plug-in card that can be plugged into the PC.

In a development of the control system, the control of the automation process comprises actuation of a linear motor, wherein the signal units are configured as coil actuation units for applying a drive signal to drive coils of the linear motor, and wherein the coil actuation units are configured to generate the drive signal on the basis of the output data.

The control system allows the coil actuation units to be supplied with output data via the data network at particularly short intervals of time and thus allows the linear motor to be actuated particularly precisely.

A network module for a control system for controlling an automation process via a data network that comprises a superordinate data path and subordinate data paths is specified, wherein the sum of the transmission rates on the subordinate data paths corresponds to no more than the transmission rate on the superordinate data path and wherein the subordinate data paths comprise at least a first subordinate data path and a second subordinate data path. The network module has a superordinate interface for connection to a control device of the control system via the superordinate data path, a first subordinate interface for connection to signal units of the control system via the first subordinate data path, a second subordinate interface for connection to signal units of the control system via the second subordinate data path, a reception module, an assignment module and a communication module. The reception module is configured to receive, during a communication cycle of a control cycle of the control system, via the superordinate interface, a first portion of a sum total of first output data transmitted in the communication cycle from the control device to the signal units connected to the first subordinate data path and a first portion of a sum total of second output data transmitted in the communication cycle from the control device to the signal units connected to the second subordinate data path. The assignment module is configured to assign, during the communication cycle, the first portion of the first output data to the first subordinate interface and the first portion of the second output data to the second subordinate interface. The communication module is configured to send, during the communication cycle, the first portion of the first output data via the first subordinate interface and the first portion of the second output data via the second subordinate interface. The reception module is configured to receive, during the communication cycle and after the reception of the first portions of the first and second output data, a second portion of the first output data and a second portion of the second output data. The assignment module is configured to assign, during the communication cycle, the second portion of the first output data to the first subordinate interface and the second portion of the second output data to the second subordinate interface. The communication module is configured to send, during the communication cycle, the second portion of the first output data via the first subordinate interface immediately subsequently to the first portion of the first output data, and the second portion of the second output data via the second subordinate interface immediately subsequently to the first portion of the second output data.

In a development of the network module, the network module comprises a timer module that is configured to provide, during the communication cycle, the first output data and the second output data with a piece of time information in order to synchronize the signal units of the first subordinate data path and the signal units of the second subordinate data path to a common time base.

In a development of the network module, the network module comprises a synchronization module that is connected to the timer module and configured to prescribe the piece of time information during the communication cycle. The synchronization module is connectable to a synchronization module of a further network module and configured to match, during the communication cycle, the piece of time information to a further piece of time information prescribed by the further synchronization module.

BRIEF DESCRIPTION OF THE DRAWINGS

The invention is explained in more detail below on the basis of exemplary embodiments and with reference to figures in which, in each case in a schematic depiction.

DETAILED DESCRIPTION

Figure 1:
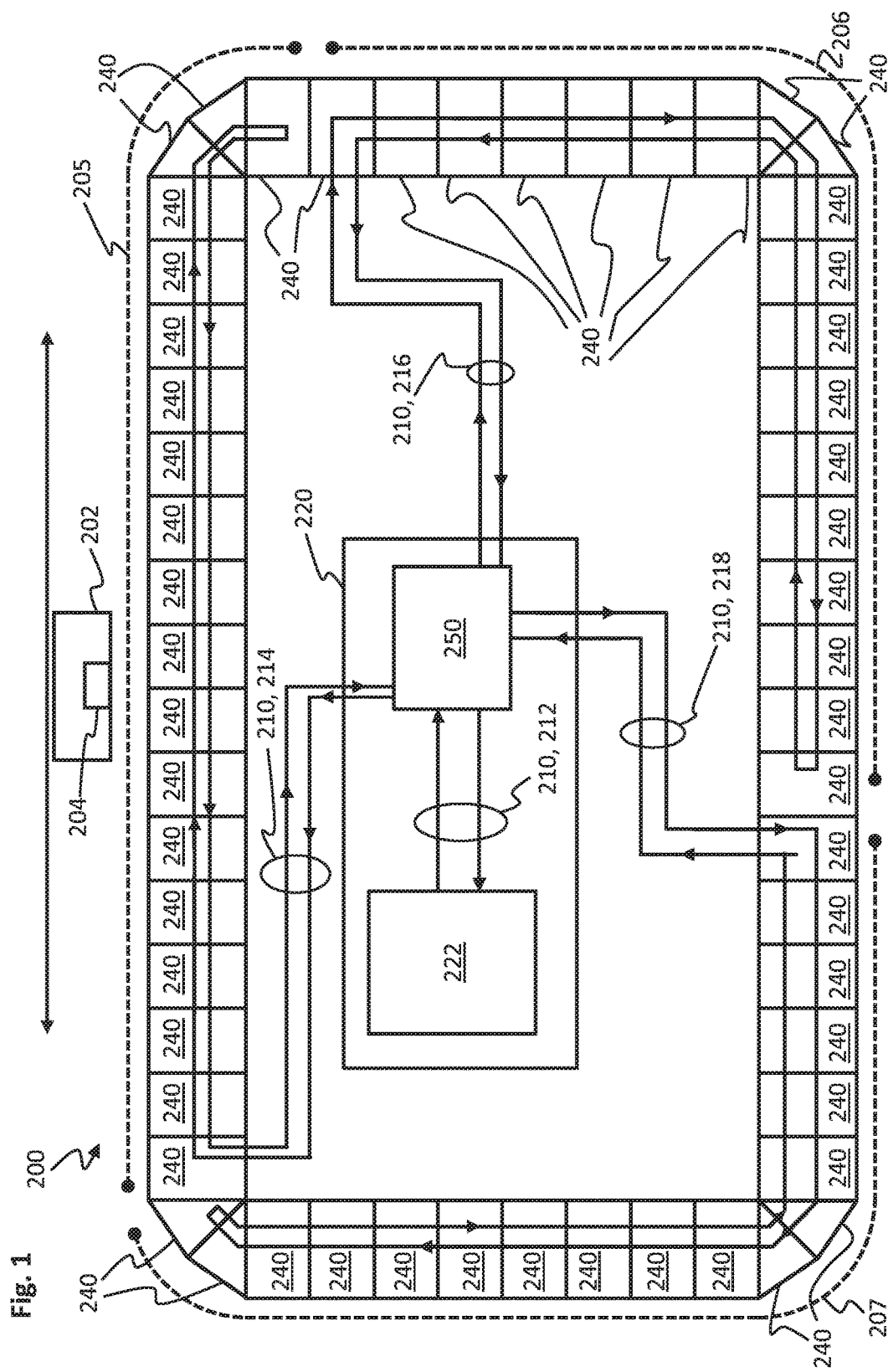
FIG. 1 shows a control system for controlling an automation process.

FIG. 1 shows a control system 200 for controlling an automation process having a control device 222 and multiple signal units 240. The control system 200 comprises a data network 210 via which the control device 222 is connected to the signal units 240 and can interchange data therewith. Moreover, the control system 200 comprises a network module 250 that is likewise connected to the data network 210 and is situated between the control device 222 and the signal units 240. In the control system 200, the signal units 240 are thus not connected to the control device 222 directly via a data path. Instead, the signal units 240 are connected to the network module 250 via a first subordinate data path 214, a second subordinate data path 216 or a third subordinate data path 218 of the data network 210 and the network module 250 is for its part connected to the control device 222 via a superordinate data path 212 of the data network 210.

Output data that are sent from the control device 222 to the signal units 240 thus pass first of all through the superordinate data path 212 to the network module 250 and subsequently through one of the subordinate data paths 214, 216, 218 from the network module 250 to the signal units 240. In this case, the network module 250 acts as a distributor module that receives the output data via the first data channel 212 and splits them over the first, second and third subordinate data paths 214, 216, 218.

In the control system 200 depicted in FIG. 1, the first subordinate data path 214 and the second subordinate data path 216 each have nineteen signal units 240 connected to them. The third subordinate data path 218 has eighteen signal units 240 connected to it. The signal units 240 are configured to use the data network 210 to receive output data from the control device 222 and to take the output data as a basis for outputting output signals to the automation process, for example to actuators connected to the automation process. Alternatively or additionally, the signal units 240 may be configured to read in input signals from the automation process, for example from sensors connected to the automation process, to convert them into input data and to transmit the input data to the control device 222 via the data network 210. In this case, each of the signal units 240 may be configured either only to output (or transmit) output signals, only to read in input signals or else both to output (or transmit) output signals and to read in input signals.

In alternative embodiments of the control system 200, the subordinate data paths 214, 216, 218 may also each have a different number of the signal units 240 connected to them. In particular, the subordinate data paths 214, 216, 218 may each have the same number of signal units 240 connected to them. Alternatively, a respective different number of signal units 240 may be connected to the subordinate data paths 214, 216, 218.

The control device 222 is configured to evaluate the input data received from the signal units 240 via the data network 210 in order to determine a state of the controlled automation process, and to take the input data as a basis for generating output data in order to influence the state of the automation process in accordance with a control program running in the control device 222. Moreover, the control device 222 is configured to output the output data to the signal units 240 via the data network 210.

The control system 200 can, as depicted in FIG. 1, comprise a drive having an electric motor. In the depicted system, the electric motor is configured as a linear motor having a rotor 202 mobile along a path. The path may in particular, as depicted, be configured as a closed path. The path comprises a first segment 205, a second segment 206 and a third segment 207. The rotor 202 can be moved seamlessly from one segment 205, 206, 207 to another segment 205, 206, 207 on the path. The signal units 240 are each arranged in stator modules of the linear motor. The stator modules are arranged subsequently to one another along the path.

The signal units 240 are each configured as coil actuation units. Each of the signal units 240 applies a drive signal to a respective one or more drive coils of the linear motor, which drive signal moves the rotor. The drive signal may be a coil current for a drive coil, for example. The signal units 240 are configured to generate the drive signal on the basis of the output data received from the control device 222. By way of example, the output data can each comprise current values for coil currents that are to be applied to the drive coils.

Moreover, the signal units 240 can each comprise a position sensing system that interacts with a position sensor 204 arranged on the rotor 202 and generates position signals that represent the position of the rotor 202 along the path. The input data transmitted from the signal units 240 to the control device 222 can comprise position data that represent the position signals captured from the position sensing system. The control device 222 may in particular be configured to regulate the position of the rotor 202 on the basis of the position data, that is to say to ascertain an instantaneous position of the rotor 202 from the input data and to generate output data that move the rotor 202 in the direction of a desired target position. The position sensing system may be an inductive position sensing system, for example.

The signal units 240 of one of the segments 205, 206, 207 are each connected to the network module 250 via one of the subordinate data paths 214, 216, 218. As such, the nineteen signal units 240 of the first segment 205 are connected to the network module 250 via the first subordinate data path 214, the nineteen signal units 240 of the second segment 206 are connected to the network module 250 via the second subordinate data path 216 and the eighteen signal units 240 of the third segment 207 are connected to the network module 250 via the third subordinate data path 218.

The control of the automation process is effected in successive control cycles, in particular in directly subsequent control cycles, in the control system 200. One of the control cycles comprises a computation cycle and a communication cycle. During the computation cycle, the control device 222 computes a sum total of the output data transmitted to the signal units 240 in the control cycle. The control device 222 can compute the sum total of the output data, for example after the control program is prescribed, by evaluating a sum total of input data that have been transmitted to the control device 222 in a preceding control cycle and computing the output data on the basis of the input data. The signal units 240 can output, during the computation cycle, output data that they have obtained in a preceding control cycle and can read in a sum total of the input data that need to be transmitted to the control device 222 in the current control cycle.

During the communication cycle, the sum total of the output data that is produced in the control device 222 is transmitted to the signal units 240 via the data network 210 for output to the automation process. Moreover, during the communication cycle, the sum total of all the input data that need to be transmitted from the signal units 240 to the control device 222 via the data network 210 in the control cycle can be transmitted to the control device 222 for further evaluation. After completion of the communication cycle, the sum total of the output data is thus present in the applicable signal units 240 and the sum total of the input data is present in the control device 222.

If the control system 200 comprises the linear motor depicted in FIG. 1, it is in particular possible for each of the drive coils in the signal units 240 to be actuated separately and individually. The sum total of the output data can comprise an individual current value for every single one of the drive coils distributed along the path. Moreover, the position sensing systems in the signal units 240 can be read separately and individually. In particular, the sum total of the input data can comprise respective position data from each of the position sensing systems.

The sum total of the output data that is computed by the control device 222 during the computation cycle comprises a sum total of first output data transmitted in the communication cycle of the control cycle to the signal units 240 connected to the first subordinate data path 214, a sum total of second output data transmitted in the communication cycle of the control cycle to the signal units 240 connected to the second subordinate data path 216 and a sum total of third output data transmitted in the communication cycle of the control cycle to the signal units 240 connected to the third subordinate data path 218.

The sum total of the first output data, the sum total of the second output data and the sum total of the third output data are first of all transmitted to the network module 250 via the superordinate data path 212 during the communication cycle. The network module 250 is configured to forward to the applicable signal units 240 the sum total of first output data via the first subordinate data path 214, the sum total of second output data via the second subordinate data path 216 and the sum total of third output data via the third subordinate data path 218. The first output data subsequently pass through, in order, the signal units 240 connected to the first subordinate data path 214. The second output data pass through, in order, the signal units 240 connected to the second subordinate data path 216 and the third output data pass through, in order, the signal units 240 connected to the third subordinate data path 218.

The transmission of the first output data, the transmission of the second output data and the transmission of the third output data on the respective subordinate data paths 214, 216, 218 can be effected at least partly at the same time in each case. In contrast to a control system in which the sum total of the output data, proceeding from the control device 222, passes through all the signal units 240 on a single data path of the data network 210 in order, the control system 200 requires less time for the transmission of the sum total of the output data to the signal units.

The data transmission rate on the subordinate data paths 214, 216, 218 is lower than the data transmission rate on the superordinate data path 212. In particular, the sum of the data transmission rates on the subordinate data paths 214, 216, 218 corresponds to no more than the data transmission rate on the superordinate data path 212. In particular, the data transmission rate on the superordinate data path 212 may be higher than the sum of the data transmission rates on the subordinate data paths 214, 216, 218. By way of example, the data transmission rate on the subordinate data paths 214, 216, 218 may be 100 Mbit/s in each case. The data transmission rate on the superordinate data path 212 may be 1 Gbit/s, for example, and the network module 250 can have up to ten subordinate data paths connected to it. The data transmission rate on the superordinate data path 212 may also be more than 20 Gbit/s or more than 50 Gbit/s and the network module 250 can have up to sixteen subordinate data paths connected to it.

The subordinate data paths 214, 216, 218 may be configured, by way of example, as field buses, for example as field buses having a circulating message traffic. In particular, they may be configured as field buses based on the Profibus, HART, Foundation, Interbus or EtherCAT standard.

The superordinate data path 212 may be configured as an internal databus, in particular as a databus based on the PCI Express standard. The control device 222 and the network module 250 may, as depicted in FIG. 1, be arranged in a common housing composite 220. By way of example, the control device 222 and the network module 250 may be arranged in a housing composite 220 configured as a PC, in particular as an industrial PC. The control device 222 can comprise a microprocessor or a programmable microcontroller. The network module 250 may be configured as a plug-in module or as a plug-in card for the PC and can comprise a programmable microcontroller or an FPGA.

In other embodiments of the control system 200, the signal units 240 may also be connected to the network module 250 via more than the depicted three subordinate data paths 214, 216, 218. If the data transmission rate on the superordinate data path 212 is 1 Gbit/s, for example, and on each of the subordinate data paths is 100 Mbit/s, for example, then, given the stipulation that the sum of the transmission rates on the subordinate data paths corresponds to no more than the data transmission rate on the superordinate data path, no more than ten subordinate data paths may be connected to the network module 250. Embodiments of the control system 200 are also possible in which only two subordinate data paths, for example the first and the second subordinate data path 214, 216 are connected to the network module 250.

The control device 222 is configured to transmit, during the communication cycle, first of all only respective first portions of the sum total of the first output data, of the sum total of the second output data and of the sum total of the third output data to the network module via the superordinate data path 212. The network module 250 is configured to already send the first portions of the first, second and third output data via the subordinate data paths 214, 216, 218 while the remaining portions of the first, second and third output data are still being transmitted to the network module 250 via the superordinate data path 212. This reduces the latency of the data transmission, caused by the splitting of the output data over the subordinate data paths 214, 216, 218, in comparison with a system in which first of all the sum total of the first output data for the first subordinate data path 214, subsequently the sum total of the second output data for the second subordinate data path 216 and subsequently the sum total of the third output data for the third subordinate data path 218 are transmitted to the network module 250 via the superordinate data path 212.

Figure 2:
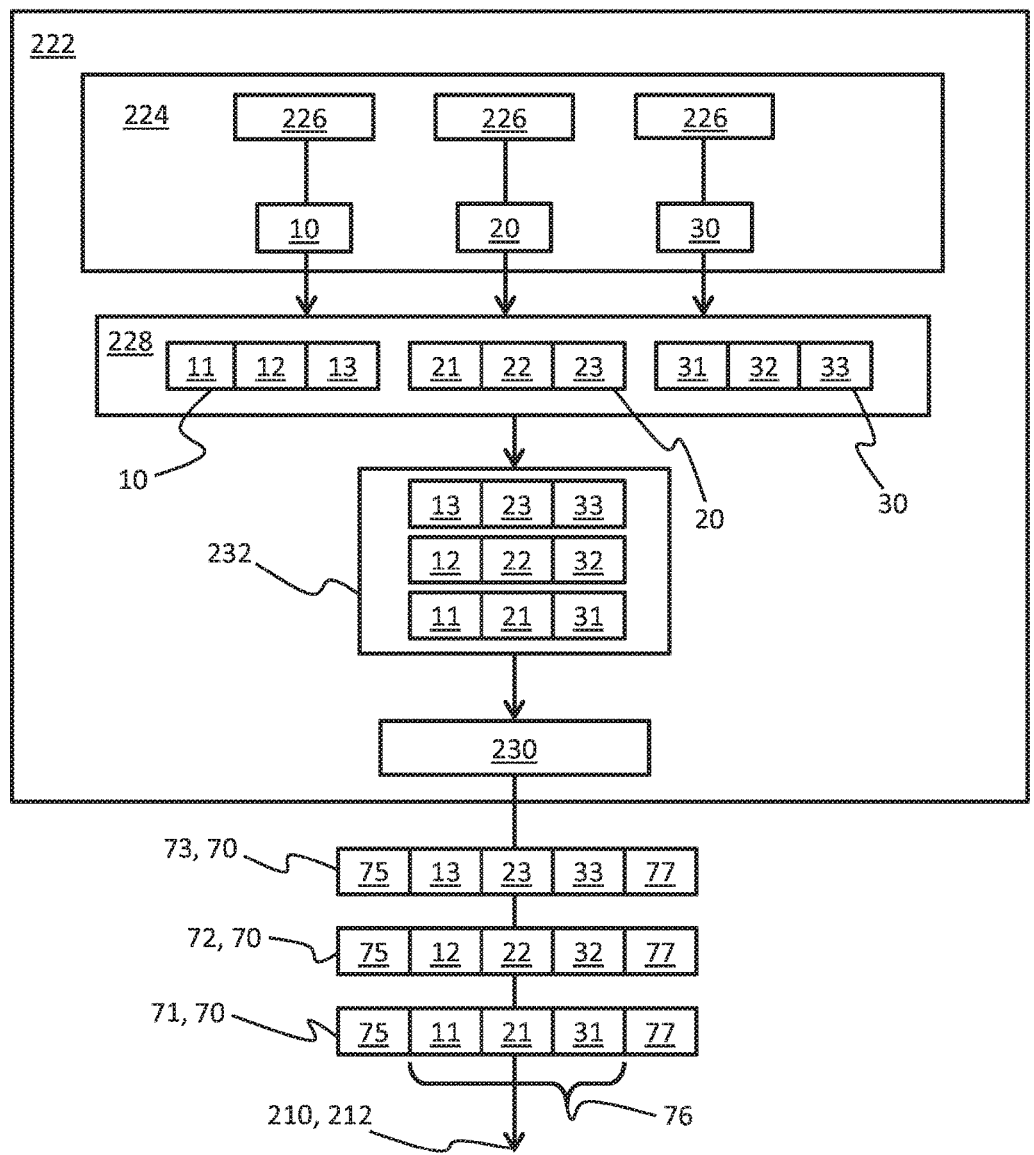
FIG. 2 shows a control device for a control system for controlling an automation process via a data network.

FIG. 2 shows a schematic view of the control device 222. The control device 222 comprises a processing module 224 that is configured to process the input data and provide the sum total of the output data in accordance with a control program. To this end, the processing module 224, as depicted in FIG. 2, can have a respective separate control module 226 for the individual subordinate data paths 214, 216, 218. Each of the control modules 226 is configured to process the input data of the signal units 240 connected to the respective subordinate data paths 214, 216, 218 and to compute and provide the respective output data for the signal units 240 connected to the respective subordinate data path 214, 216, 218.

During the control cycle, a first of the control modules 226 provides a sum total of first output data 10 that are transmitted in the communication cycle of the control cycle to the signal units 240 connected to the first subordinate data path 214. Moreover, a second of the control modules 226 provides a sum total of second output data 20 that are transmitted in the communication cycle to the signal units 240 connected to the second subordinate data path 216, and a third of the control modules 226 provides a sum total of third output data 30 that are transmitted in the communication cycle to the signal units 240 connected to the third subordinate data path 218.

Moreover, the control device 222 has a splitting module 228. The processing module 224 is connected to the splitting module 228 and provides the output data 10, 20, 30 to the splitting module 228. The splitting module 228 is configured to split, during the communication cycle, the sum total of the first output data 10 into a first portion 11, a second portion 12 and a third portion 13. Moreover, the splitting module 228 is configured to split the sum total of the second output data 20 into a first portion 21, a second portion 22 and a third portion 23 and the sum total of the third output data 30 into a first portion 31, a second portion 32 and a third portion 33.

The splitting module 228 is connected to an output memory 232 of the control device 222. The splitting module 228 is configured to store the portions 11, 12, 13, 21, 22, 23, 31, 32, 33 of the output data 10, 20, 30 in the output memory 232 after splitting. A transmission module 230 of the control device 222 is connected to the output memory 232 and to the superordinate data path 212 and configured to take the output data 10, 20, 30 from the output memory 232 and transmit them via the superordinate data path 212.

The output memory 232 may, by way of example, be configured as an internal memory of a processor or microcontroller comprising or executing the processing module 224. The output memory 232 may also be configured as an external memory chip of a circuit board carrying the processor or microcontroller, for example a motherboard.

The processing module 224, the control modules 226, the splitting module 228 and/or the transmission module 230 may each be configured as software modules that can be executed on the processor or microcontroller of the control device 222, for example. The modules 224, 226, 228, 230 of the control device 222 may alternatively be configured as individual chips. In particular, the transmission module 230 may be configured as a protocol chip for the superordinate data path 212, for example as a PCI Express protocol chip.

The splitting module 228 and the transmission module 230 are configured to transmit first of all the first portions 11, 21, 31 of the first, second and third output data 10, 20, 30, subsequently the second portions 12, 22, 32 of the first, second and third output data 10, 20, 30 and subsequently the third portions 13, 23, 33 of the first, second and third output data 10, 20, 30 to the network module 250 via the superordinate data path 212. In particular, the splitting module 228 and the transmission module 230 may be configured to transmit first of all the first portion 11 of the first output data 10, then the first portion 21 of the second output data 20, then the first portion 31 of the third output data 30, then the second portion 12 of the first output data 10, then the second portion 22 of the second output data 20, then the second portion 32 of the third output data 30, then the third portion 13 of the first output data 10, then the third portion 23 of the second output data 20 and then the third portion 33 of the third output data 30.

The transmission module 230 is configured to send the output data 10, 20, 30 in accordance with a protocol prescribed by the transmission standard of the superordinate data path 212. By way of example, the transmission module 230 may be configured to transmit the output data 10, 20, 30 in data packets 70 on the superordinate data path 212. To this end, the transmission module 230 can transmit the output data 10, 20, 30 in a data section 76 of the data packet 70 and place a header section 75 of the data packet 70 in front of the data section 76 and add an end section 77 of the data packet 70 to the data section 76. The header section 75 can comprise address information that identifies the network module 250 as a receiver of the data packet 70 on the superordinate data path 212. The header section 75 may in particular be configured as a PCI Express header. The end section 77 can comprise a check value that has been computed on the basis of the portions of the output data 10, 20, 30 that are included in the data packet 70 and that is able to be used by the network module 250 to detect distortion of the data packet 70 during the transmission on the superordinate data path 212.

In particular, the splitting module 228 and the transmission module 230 may be configured to transmit first of all the first portions 11, 21, 31 of the first, second and third output data 10, 20, 30 in a first data packet 71, subsequently the second portions 12, 22, 32 of the first, second and third output data 10, 20, 30 in a second data packet 72 and subsequently the third portions 13, 23, 33 of the first, second and third output data 10, 20, 30 in a third data packet 73 via the superordinate data path 212. In this case, the first, second and third portions 11, 12, 13 of the first output data 10 may be arranged in the data packets 70 such that they are transmitted before the first, second and third portions 21, 22, 23, respectively, of the second output data 20. Equally, the first, second and third portions 21, 22, 23 of the second output data 20 may be arranged in the data packets 70 such that they are transmitted before the first, second and third portions 31, 32, 33, respectively, of the third output data 30.

In alternative embodiments, it is also possible for multiple portions of the first output data 10, of the second output data 20 and/or of the third output data 30 to be transmitted in one of the data packets 70. In this case, it is in particular possible for the order of the transmission of the portions of the output data 10, 20, 30 via the superordinate data path 212 to remain the same as for the transmission depicted in FIG. 1. By way of example, the data section 76 of the first data packet 71 can successively comprise the first portion 11 of the first output data 10, the first portion 21 of the second output data 20, the first portion 31 of the third output data 30, the second portion 12 of the first output data 10, the second portion 22 of the second output data 20 and the second portion 32 of the third output data 30. In this case, the second data packet 72 can be dispensed with and, after the first data packet 71, a data packet 70 having the content of the third data packet 73 can be transmitted.

It is also possible for the first data packet 71 already to be transmitted via the superordinate data path 212 as soon as the first portions 11, 21, 31 are in the output memory 232 and before the remaining portions 12, 13, 22, 23, 32, 33 are in the output memory 232. Furthermore, it may be possible for the processing module 226 and the splitting module 228 to already transmit the first portions 11, 21, 31 of the output data 10, 20, 30 to the output memory 232 before the computation cycle is fully complete. By way of example, the first portions 11, 21, 31 of the output data 10, 20, 30 can no longer be altered and/or used at a particular time during the further computation of the output data 10, 20, 30, which means that these portions 11, 21, 31 can be transmitted to the output memory 232 from this time onward.

Figure 3:
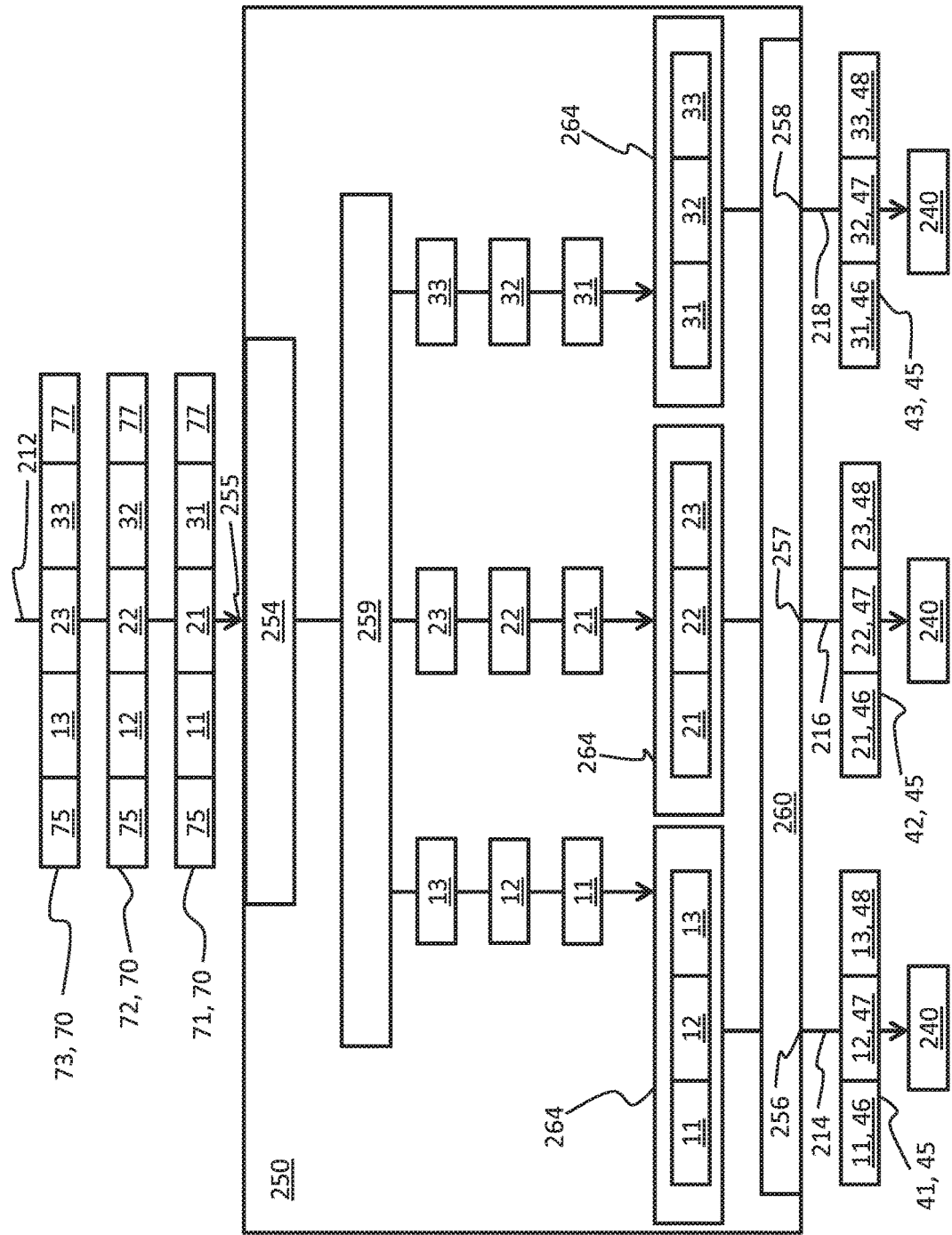
FIG. 3 shows a network module and signal units for a control system for controlling an automation process via a data network.

FIG. 3 shows the network module 250 and the signal units 240 in a schematic depiction. The network module 250 comprises a reception module 254 that is connected to a superordinate interface 255 of the network module 250. The superordinate interface 255 connects the network module 250 to the superordinate data path 212 and the control device 222. The reception module 254 is configured to receive the output data 10, 20, 30 in accordance with the protocol for data transmission on the superordinate data path 212. In particular, the reception module 254 is configured to receive the portions 11, 12, 13, 21, 22, 23, 31, 32, 33 of the output data 10, 20, 30 in the same order in which they were transmitted by the control device 222 via the superordinate data path 212. Moreover, the reception module 254 may be configured to check the check value in the end section 77 of the data packets 70 and if appropriate to detect distortion of the output data 10, 20, 30 that has taken place during the transmission.

The reception module 254 is connected to an assignment module 259 and configured to forward the first portions 11, 21, 31, the second portions 12, 22, 32 and the third portions 13, 23, 33 of the output data 10, 20, 30 to the assignment module 259. The assignment module 259 is connected to a first subordinate interface 256, a second subordinate interface 257 and a third subordinate interface 258 via in each case an output memory 264 and a communication module 260. The first subordinate interface 256 is connected to the first subordinate data path 214, the second subordinate interface 257 is connected to the second subordinate data path 216 and the third subordinate interface 258 is connected to the third subordinate data path 218.

The assignment module 259 is configured to assign the first, second and third portions 11, 12, 13 of the first output data 10 to the first subordinate interface 256, the first, second and third portions 21, 22, 23 of the second output data 20 to the second subordinate interface 257 and the first, second and third portions 31, 32, 33 of the third output data 30 to the third subordinate interface 258. To this end, the assignment module 259 may be configured to transmit the first, second and third portions 11, 12, 13 of the first output data 10 to the respective output memory 264 connected to the first subordinate interface 256, the first, second and third portions 21, 22, 23 of the second output data 20 to the respective output memory 264 connected to the second subordinate interface 257 and the first, second and third portions 31, 32, 33 of the third output data 30 to the output memory 264 connected to the third subordinate interface 258.

The communication module 260 is configured to send to the signal units 240 first of all the first portion 11 of the first output data 10 via the first subordinate interface 256 in accordance with the data transmission protocol of the first subordinate data path 214, the first portion 21 of the second output data 20 via the second subordinate interface 257 in accordance with the data transmission protocol of the second subordinate data path 216 and the first portion 31 of the third output data 30 via the third subordinate interface 258 in accordance with the data transmission protocol of the third subordinate data path 218. Subsequently, the second portion 12 of the first output data 10 is transmitted via the first subordinate interface 256, the second portion 22 of the second output data 20 is transmitted via the second subordinate interface 257 and the second portion 32 of the third output data 30 is transmitted via the third subordinate interface 258 to the signal units 240 in accordance with the respective data transmission protocols. Finally, the third portion 13 of the first output data 10 is transmitted via the first subordinate interface 256, the third portion 23 of the second output data 20 is transmitted via the second subordinate interface 257 and the third portion 33 of the third output data 30 is transmitted via the third subordinate interface 258 to the signal units 240 in accordance with the respective data transmission protocols.

The sending of the first portions 11, 21, 31 of the output data 10, 20, 30 can in particular already be effected while the second portions 12, 22, 32 and/or the third portions 13, 23, 33 of the output data 10, 20, 30 are still being transmitted to the network module 250 via the superordinate data path 212. In particular, the sending of the first portion 21 of the second output data 20 via the second subordinate data path 216 can already be begun before the transmission of the second portion 12 of the first output data 10 via the superordinate data path 212 is finished. Equally, the transmission of the first portion 31 of the third output data 30 can already be begun before the transmission of the second portion 12 of the first output data 10 via the superordinate data path 212 is finished.

The sending of the second portion 22 of the second output data 20 via the second subordinate data path 216 can also already be begun before the transmission of the third portion 13 of the first output data 10 via the superordinate data path 212 is finished. Equally, the transmission of the second portion 32 of the third output data 30 can already be begun before the transmission of the third portion 33 of the first output data 10 via the superordinate data path 212 is finished.

The communication module 260 may be configured to send each of the second portions 12, 22, 32 of the output data 10, 20, 30 via the respective subordinate data paths 214, 216, 218 immediately subsequently to the first portions 11, 21, 31 of the output data 10, 20, 30. Analogously, the communication module 260 may be configured to send each of the third portions 13, 23, 33 of the output data 10, 20, 30 via the respective subordinate data paths 214, 216, 218 immediately subsequently to the second portions 12, 22, 32.

Since the sum of the data transmission rates on the subordinate data paths 214, 216, 218 corresponds to no more than the data transmission rate on the superordinate data path 212, it is possible, if control data used on the superordinate data path 212 are ignored, to ensure that during the sending of the first or second portions 11, 21, 31, 12, 22, 32 of the output data 10, 20, 30 via the subordinate data paths 214, 216, 218 the second and third portions 12, 22, 32, 13, 23, 33 of the output data 10, 20, 30 can be transmitted via the superordinate data path 212 for all the subordinate data paths 214, 216, 218 and thus the output memories 264 of the network module 250 do not run dry. If, in addition to the output data 10, 20, 30, control data, for example the header sections 75 and the end sections 76 of the data packets 70, are also transmitted via the superordinate data path 212, then the data network 210 is configured such that the data transmission rate on the superordinate data path 212 is higher than the sum of the data transmission rates on the subordinate data paths 214, 216, 218 by at least the factor that corresponds to the ratio of the control data needed for transmitting the sum total of the output data 10, 20, 30 to the sum total of the output data 10, 20, 30. Equally, possible repetitions of erroneously transmitted data packets 70 via the superordinate data path 212 can be taken into consideration in the dimensioning of the data transmission rates. The data transmission rate of the superordinate data path 212 is then so high that an erroneous transmission of a data packet 70 does not result in the output memories 264 of the network module 250 running dry.

Generally, the transmission period needed overall for transmitting a respective portion 11, 21, 31, 12, 22, 32, 13, 23, 33 of the output data 10, 20, 30 provided for the individual subordinate data paths 214, 216, 218, for example for transmitting the second portions 12, 22, 32 or for transmitting the third portions 13, 23, 33, corresponds in each case to no more than the transmission period required for sending the portions 11, 21, 31, 12, 22, 32, 13, 23, 33 of the output data 10, 20, 30 that precede the relevant portions 11, 21, 31, 12, 22, 32, 13, 23, 33 on the respective subordinate data paths 214, 216, 218, for example for sending the first portions 11, 21, 31 or for sending the second portions 12, 22, 32.

The control system 200 may be configured to transmit the output data 10, 20, 30 on the subordinate data paths 214, 216, 218 by means of data messages in each case. In particular, the output data 10, 20, 30 can be transmitted by means of circulating data messages, for example by means of EtherCAT messages. In the case of circulating messages, the data messages can, proceeding from the network module 250, first of all pass with the output data 10, 20, 30 through all the signal units 240 of a subordinate data path 214, 216, 218 in order and subsequently return to the network module 250 on the respective subordinate data path 214, 216, 218. The subordinate data paths 214, 216, 218 may be embodied in ring or linear topology. The signal units 240 take the output data 10, 20, 30 from the circulating data messages and for their part insert input data into the circulating data messages in order to send the input data to the network module 250 and the control device 222.

The transmission of the output data 10, 20, 30 on the subordinate data paths 214, 216, 218 can be effected based on the generally known master/slave principle, for example. By way of example, for each of the subordinate data paths 214, 216, 218 a master unit may be arranged in the network module 250, for example in the communication module 260 thereof, which master unit produces the data messages and coordinates the data traffic on the subordinate data paths 214, 216, 218. The signal units 240 can then each comprise a slave unit.

It is fundamentally also possible for data messages based on different protocols to be used on the individual subordinate data paths 214, 216, 218.

The first, second and third portions 11, 12, 13 of the first output data 10 can each be sent by the network module 250 as immediately subsequent sections of a data field 45 of a first data message 41 on the first subordinate data path 214, the first, second and third portions 21, 22, 23 of the second output data 20 can each be sent by the network module 250 as immediately subsequent sections of a data field 45 of a second data message 42 on the second subordinate data path 216 and the first, second and third portions 31, 32, 33 of the third output data 30 can each be sent by the network module 250 as immediately subsequent sections of a data field 45 of a third data message 43 on the third subordinate data path 218.

The first portions 11, 21, 31 of the first, second and third output data 10, 20, 30 each form a first section 46 of the data fields 45 of the data messages 41, 42, 43. The second portions 21, 22, 32 of the first, second and third output data 10, 20, 30 each form a second section 47 of the data fields 45 of the data messages 41, 42, 43 that is immediately subsequent to the applicable first section 46. The third portions 31, 32, 33 of the first, second and third output data 10, 20, 30 each form a third section 48 of the data fields 45 of the data messages 41, 42, 43 that is immediately subsequent to the applicable second section 47.

Besides the data fields 45, the data messages 41, 42, 43 can also, like the data packets 70 of the superordinate data path 212, each have an initial sequence having address information and/or a closing sequence having check information. The initial sequence and/or the check information may be part of control data of the data messages 41, 42, 43 that control the distribution of the data messages 41, 42, 43 to the subordinate data paths 214, 216, 218. The address information and/or the check information or the control data can be produced in the control device 222, for example, and transmitted to the network module 250 together with the output data 10, 20, 30 via the superordinate data path 212.

Figure 4:
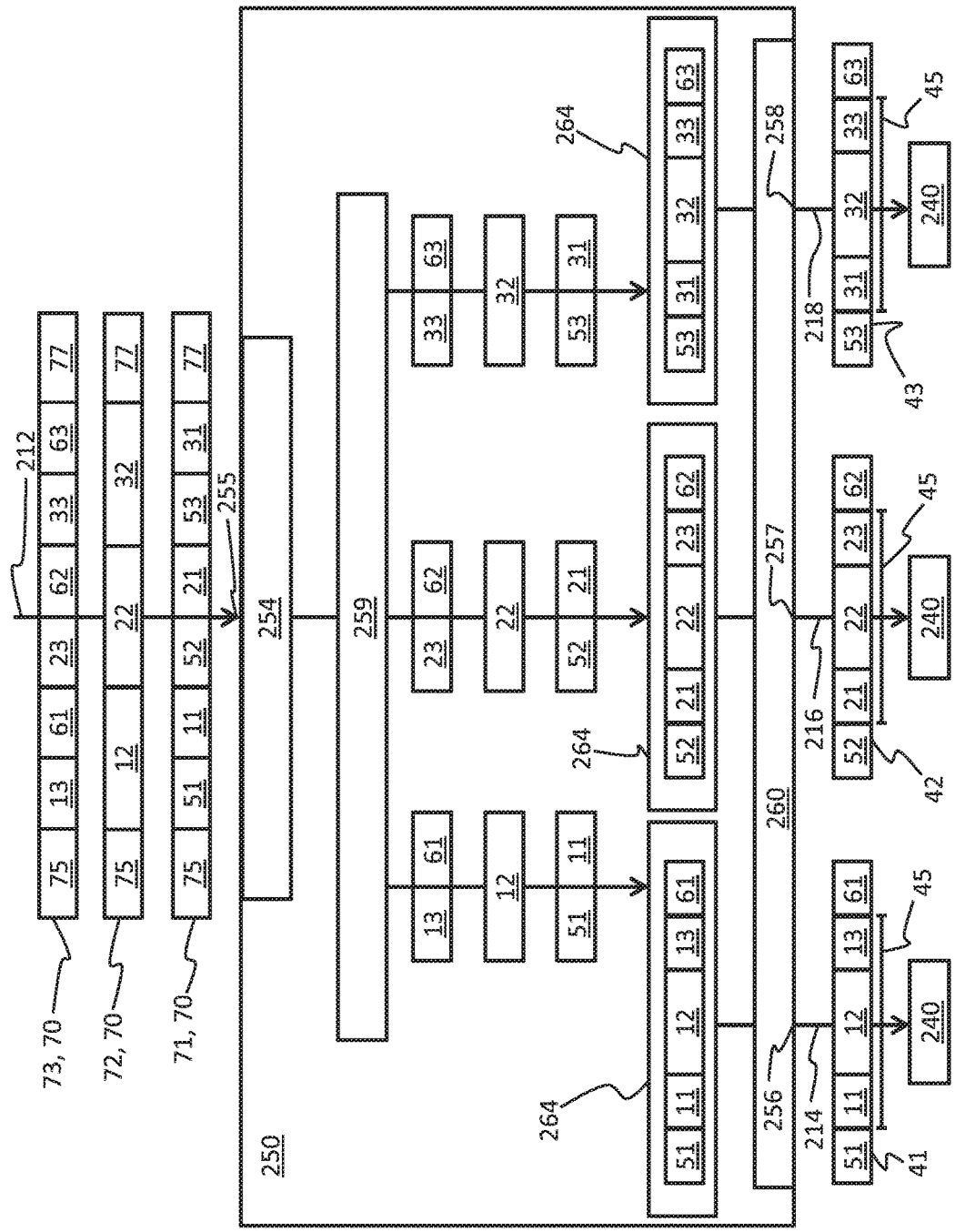
FIG. 4 shows the network module and the signal units together with initial sequences and check information for subordinate data paths of the data network.

FIG. 4 shows a depiction of the network module 250 and the signal units 240 together with initial sequences 51, 52, 53 and check information 61, 62, 63 for the data messages 41, 42, 43 of the subordinate data paths 214, 216, 218. In the control device 222, a first initial sequence 51 for the first data message 41 of the first subordinate data path 214, a second initial sequence 52 for the second data message 42 of the second subordinate data path 216 and a third initial sequence 53 for the third data message 43 of the third subordinate data path 218 have been produced.

The initial sequences 51, 52, 53 may be configured analogously to the header sections 75 of the data packets 70 of the superordinate data path 70 and, by way of example, can comprise address information that stipulates the receivers of the output data included in the data messages 41, 42, 43. The initial sequences 51, 52, 53 can also include identifiers, stipulate the type of the data messages 41, 42, 43 or stipulate the transmission protocol used for each of the data messages 41, 42, 43. The initial sequences 51, 52, 53 can in particular each comprise a header of the data messages 41, 42, 43.

The check information 61, 62, 63 may have been computed on the basis of the output data 10, 20, 30 transmitted in the data messages 41, 42, 43. The check information 61, 62, 63 may be a checksum, in particular a cyclic redundancy check (CRC) checksum. A comparison of the output data 10, 20, 30 transmitted in one of the data messages 41, 42, 43 with the check information 61, 62, 63 can be used to respectively ascertain whether the output data 10, 20, 30 have been distorted during the data transmission via the data network 210, for example.

The pieces of check information 61, 62, 63 for the data messages 41, 42, 43 of the subordinate data paths 214, 216, 218 are each computed on the basis of the sum total of those output data 10, 20, 30 that are transmitted in the applicable data message 41, 42, 43 of the respective subordinate data path 214, 216, 218. By way of example, the sum total of the first output data 10 is taken as a basis for computing a first piece of check information 61, the sum total of the second output data 20 is taken as a basis for computing a second piece of check information 62 and the sum total of the third output data 30 is taken as a basis for computing a third piece of check information 63. The first piece of check information 61 is thus assigned to the first output data 10, the second piece of check information 62 is assigned to the second output data 20 and the third piece of check information 63 is assigned to the third output data 30.

The pieces of check information 61, 62, 63 and/or the initial sequences 51, 52, 53 can be produced by the processing module 224, in particular in each case by the control modules 226, of the control device 222, for example. By way of example, the initial sequences 51, 52, 53 can be placed in front of the respective output data 10, 20, 30 by the control device 222 or the control modules 226 and transmitted to the splitting module 228. By way of example, the pieces of check information 61, 62, 63 can be added to the respective output data 10, 20, 30 and transmitted to the splitting module 228.

The pieces of check information 61, 62, 63 may also each be a portion of an end sequence of the respective data messages 41, 42, 43 transmitted via the subordinate data paths 214, 216, 218. The end sequences can be produced, transmitted via the data network 210 and assigned to the subordinate data paths 214, 216, 218 in the same way as described for the pieces of check information 61, 62, 63. If the output data 10, 20, 30 are transmitted on the subordinate data paths 214, 216, 218 by means of EtherCAT data messages 41, 42, 43, the end sequence may be configured as a frame check sequence (FCS), for example.

During the splitting of the output data 10, 20, 30, the splitting module 228 can split each of the pieces of check information 61, 62, 63 and/or each of the initial sequences 51, 52, 53 together with the output data 10, 20, 30 and provide them for transmission on the superordinate data path 212. By way of example, the first initial sequence 51 can be transmitted before the first portion 11 of the first output data 10, the second initial sequence 52 can be transmitted before the first portion 21 of the second output data 20 and the third initial sequence 53 can be transmitted before the first portion 31 of the third output data 30 via the superordinate data path 212, for example within the first data packet 71. This embodiment is portrayed in FIG. 4. The first, second and third initial sequences 51, 52, 53 can alternatively also be transmitted within a separate data packet 70 of the superordinate data path 212, however, for example before the first data packet 71 with the first portions 11, 21, 31 of the output data 10, 20, 30.

The first, second and third pieces of check information 61, 62, 63 can each be transmitted via the superordinate data path 212 after the last portions of the first, second and third output data 10, 20, 30 for example. By way of example, the first piece of check information 61 can be transmitted via the superordinate data path 212 after the third portion 13 of the first output data 10, the second piece of check information 62 can be transmitted via the superordinate data path 212 after the third portion 23 of the second output data 20 and the third piece of check information 63 can be transmitted via the superordinate data path 212 after the third portion 33 of the third output data 30, for example within the third data packet 73 of the superordinate data path 212, as depicted in FIG. 4. Alternatively, the first, second and third pieces of check information 61, 62, 63 can also be transmitted via the superordinate data path 212 in succession in a separate additional data packet 70 of the superordinate data path 212 after the third data packet 73.

The assignment module 259 assigns the first initial sequence 51 together with the first, second and third portions 11, 12, 13 of the first output data 10 and the first checksum 61 to the first subordinate data path 214 and transmits the first initial sequence 51, the first output data 10 and the first piece of check information 61 to the output memory 264 connected to the first subordinate data path 214. The assignment module 259 assigns the second initial sequence 52 together with the first, second and third portions 21, 22, 23 of the second output data 20 and the second checksum 62 to the second subordinate data path 216 and transmits the second initial sequence 52, the second output data 20 and the second piece of check information 62 to the output memory 264 connected to the second subordinate data path 216. The assignment module 259 assigns the third initial sequence 53 together with the first, second and third portions 31, 32, 33 of the third output data 30 and the third checksum 63 to the third subordinate data path 216 and transmits the third initial sequence 53, the third output data 30 and the third piece of check information 63 to the output memory 264 connected to the third subordinate data path 216.

Hence, full data messages 41, 42, 43 are transmitted to the output memories 264 for sending via the subordinate data paths 214, 216, 218. The communication module 260 sends the initial sequences 51, 52, 53 via the subordinate data paths 214, 216, 218 before the first portions 11, 21, 31 of the output data 10, 20, 30 are sent. By way of example, the communication module 260 can send the first, second and third initial sequences 51, 52, 53 via the first, second and third subordinate data paths 214, 216, 218 each as a section within the data fields 45 of the first, second and third data messages 41, 42, 43.

The communication module 260 sends the pieces of check information 61, 62, 63 via the subordinate data paths 214, 216, 218 after the last portions of the respective output data 10, 20, 30 are sent. By way of example, the communication module 260 can send the first piece of check information 61 via the first subordinate data path 214 after the third portion 13 of the first output data 10, the second piece of check information 62 via the second subordinate data path 216 after the third portion 23 of the second output data 20 and the third piece of check information 63 via the third subordinate data path 218 after the third portion 33 of the third output data 30. The first piece of check information 61, the second piece of check information 62 and the third piece of check information 63 can, by way of example, each be sent immediately subsequently to the third portions 13, 23, 33 of the output data 10, 20, 30, for example as part of the first data message 41, the second data message 42 and the third data message 43, respectively.

Alternatively, the pieces of check information 61, 62, 63 can also be sent not after the last portions of the output data 10, 20, 30 or as last portions of the data messages 71, 72, 73, but rather at a different point within the data stream on the subordinate data paths 214, 216, 218 or at a different point within the data messages 41, 42, 43.

The signal units 240 are configured to check the received first, second and third output data 10, 20, 30, each on the basis of the first, second or third piece of check information 61, 62, 63, for distortions or data loss during the transmission via the data network 210.

In alternative embodiments of the control system 200, the network module 250 may also be configured to add the initial sequences 51, 52, 53 to the output data 10, 20, 30. In this case, the initial sequences 51, 52, 53 do not have to be transmitted via the superordinate data path 212 with the output data 10, 20, 30, which reduces the utilization level of the superordinate data path 212. By way of example, the initial sequences 51, 52, 53 may each be preconfigured and stored in the network module 250. In this case, the network module 250 is configured to place the initial sequences 51, 52, 53 in front of the respective output data 10, 20, 30.

The assignment module 259 may be configured to assign the portions 11, 12, 13 of the first output data 10, the portions 21, 22, 23 of the second output data 20 and the portions 31, 32, 33 of the third output data 30, each on the basis of address information, to the first, second and third subordinate data paths 214, 216, 218, respectively. By way of example, the first portion 11, the second portion 12 and the third portion 13 of the first output data 10 may each be marked with a first piece of address information, the first portion 21, the second portion 22 and the third portion 23 of the second output data 20 may each be marked with a second piece of address information and the first portion 31, the second portion 32 and the third portion 33 of the third output data 30 may each be marked with a third piece of address information. By way of example, the splitting module 228 may be configured to provide each of the portions of the output data 10, 20, 30 with the address information.

The address information may be address data that are added to, for example placed in front of, each of the portions 11, 12, 13, 21, 22, 23, 31, 32, 33 of the output data 10, 20, 30. Alternatively, the address information can also be formed by the position of the portions 11, 12, 13, 21, 22, 23, 31, 32, 33 of the output data 10, 20, 30 within the data stream transmitted on the superordinate data path 212, for example by the position of the portions 11, 12, 13, 21, 22, 23, 31, 32, 33 of the output data 10, 20, 30 within the data packets 70 of the superordinate data path 212.

By way of example, the first, second and third portions 11, 12, 13 of the first output data 10 can each be transmitted via the superordinate data path 212 at the first position within the first, second and third data packets 71, 72, 73, respectively, the first, second and third portions 21, 22, 23 of the second output data 20 can each be transmitted via the superordinate data path 212 at the second position within the first, second and third data packets 71, 72, 73, respectively, and the first, second and third portions 31, 32, 33 of the third output data 30 can each be transmitted via the superordinate data path 212 at the third position within the first, second and third data packets 71, 72, 73, respectively. The length of the portions 11, 12, 13, 21, 22, 23, 31, 32, 33 of the output data 10, 20, 30 may be stored in the network module 250, and the splitting module 229 can use the stored lengths to identify the portions 11, 12, 13, 21, 22, 23, 31, 32, 33 of the output data 10, 20, 30 in the data transmitted via the superordinate data path 212. By way of example, the lengths of the portions 11, 12, 13 of the first output data 10 may each be the same, as may the lengths of the portions 21, 22, 23 of the second output data 20 and the lengths of the portions 31, 32, 33 of the third output data 30. It is also possible for the lengths of all the portions 11, 12, 13, 21, 22, 23, 31, 32, 33 of the output data 10, 20, 30 to be the same, in particular if the transmission rates on the subordinate data paths 214, 216, 218 are of equal magnitude.

In particular if the transmission rates on the subordinate data paths 214, 216, 218 are not of equal magnitude, the ratio of the lengths of the portions of the output data 10, 20, 30 can correspond to the ratio of the transmission rates on the subordinate data paths 214, 216, 218. By way of example, the ratio of the length of the portions 11, 12, 13 of the first output data 10 to the length of the portions 21, 22, 23 of the second output data 20 can correspond to the ratio of the transmission rate on the first subordinate data path 214 to the transmission rate on the second subordinate data path 216 and the ratio of the length of the portions 11, 12, 13 of the first output data 10 to the length of the portions 31, 32, 33 of the third output data 30 can correspond to the ratio of the transmission rate on the first subordinate data path 214 to the transmission rate on the third subordinate data path 218. As a result, even if the transmission rates on the subordinate data paths 214, 216, 218 are different during the sending of the portions 11, 12, 13, 21, 22, 23, 31, 32, 33 via the subordinate data paths 214, 216, 218, sufficient output data 10, 20, 30 are received for each subordinate data path 214, 216, 218 in each case via the superordinate data path 212 to be able to send each of the individual portions 11, 12, 13, 21, 22, 23, 31, 32, 33 of the output data 10, 20, 30 immediately subsequently to one another via the subordinate data paths 214, 216, 218.

If, in addition to the output data 10, 20, 30, control data, such as the initial sequences 51, 52, 53 and/or the check information 61, 62, 63, are transmitted via the superordinate data path 212, the portions of the output data 10, 20, 30 before which the initial sequences 51, 52, 53 are transmitted, for example the first portions 11, 21, 31, or the portions of the output data 10, 20, 30 after which the check information 61, 62, 63 is transmitted, for example the third portions 13, 23, 33, can each be shortened by the length of the initial sequences 51, 52, 53 or the length of the check information 61, 62, 63, so that the length of the relevant portions 11, 21, 31, 13, 23, 33, including the initial sequences 51, 52, 53 or including the check information 61, 62, 63, corresponds in each case to the length of the remaining portions, for example of the second portions 12, 22, 32 of the output data 10, 20, 30.

The absolute length of the portions 11, 12, 13, 21, 22, 23, 31, 32, 33 of the output data 10, 20, 30 can be chosen, by way of example, such that the superordinate data path 212 is utilized to an optimum degree during the transmission. In particular, the absolute length of the portions 11, 12, 13, 21, 22, 23, 31, 32, 33 of the output data 10, 20, 30 can be chosen such that the ratio of the length of the data sections 76 of the data packets 70 of the superordinate data path 212 to the length of the control data of the data packets 70, in particular to the sum of the lengths of the header sections 75 and end sections 77, is optimum. Moreover, the length of additionally required control packets, for example what are known as acknowledgement (ACK) packets or flow control packets, can be taken into consideration. If the PCI Express protocol is used on the superordinate data path 212, the absolute length of the data packets 70 may be proportioned, by way of example, such that the data packets 70 each comprise 512 bytes of useful data. If there are three subordinate data paths 214, 216, 218 having the same transmission rates, the portions 11, 12, 13, 21, 22, 23, 31, 32, 33 of the output data 10, 20, 30 may each have a magnitude or length of 170 bytes, for example.

The length of the portions 11, 12, 13, 21, 22, 23, 31, 32, 33 of the output data 10, 20, 30 can also be stipulated before the beginning of the data transmission via the data network 210 by means of an exchange of information between the control device 222 and the network module 250. In this case, it is in particular possible for the data transmission rates on the subordinate data paths 214, 216, 218 and the number of the signal units 240 connected to the subordinate data paths 214, 216, 218 to be determined and taken into consideration. The exchange of information can take place in particular by means of a handshake method. By way of example, the exchange of information can take place during an initialization of the control system 200 or of the data network 210.

Figure 5:
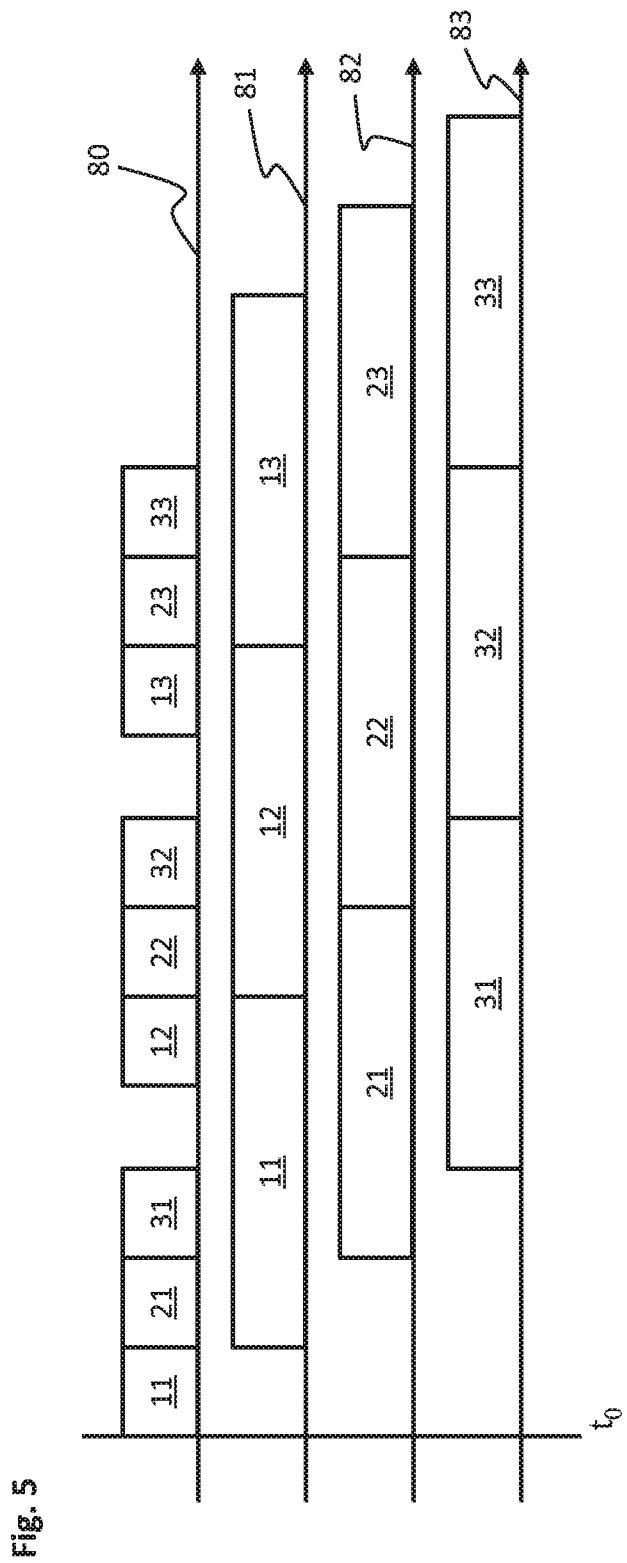
FIG. 5 shows a time characteristic for the data transmission of output data via the network module.

FIG. 5 shows a schematic depiction of the time characteristic of the data transmission of the output data 10, 20, 30 via the network module 250. Depicted on a first time axis 80 is the time characteristic of the reception of the output data 10, 20, 30 by the network module 250 via the superordinate data path 212. Plotted on a second time axis 81, a third time axis 82 and a fourth time axis 83 is the respective time characteristic of the sending of the output data 10, 20, 30 on the first subordinate data path 214, the second subordinate data path 216 and the third subordinate data path 218 by the network module 250. For the sake of simplicity, control data that are shown elsewhere for the data transmission on the data paths 212, 214, 216, 218 are not depicted again in the depiction of FIG. 5. In particular, the header section 75 and the end section 77 of the data packets 70 and the initial sequences 51, 52, 53 and the check information 61, 62, 63 of the data messages 41, 42, 43 of the subordinate data paths 214, 216, 218 are depicted elsewhere.

At a time to during the communication cycle, the reception of the first portion 11 of the first output data 10 via the superordinate data path 212 is begun. As soon as the first portion 11 of the first output data 10 has been received, the network module 250 can begin sending the first portion 11 of the first output data 10 via the first subordinate data path 214. During the sending of the first portion 11 of the first output data 10, the network module 250 receives the first portions 21, 31 of the second and third output data 20, 30. As soon as the first portion 21 of the second output data 20 has been received, the network module 250 begins sending the first portion 21 of the second output data 20 via the second subordinate data path 218. As soon as the first portion 31 of the third output data 30 has been received, the network module 250 begins sending the first portion 31 of the third output data 30 via the third subordinate data path 218.

The second portion 12 of the first output data 10 is received by the network module 250 via the superordinate data path 212 during the sending of the first portion 11 of the first output data 10 via the first subordinate data path 214, during the sending of the first portion 21 of the second output data 20 via the second subordinate data path 216 and during the sending of the first portion 31 of the third output data 30 via the third subordinate data path 218. The second portion 12 of the first output data 10 is received before the sending of the first portion 11 of the first output data 10 is complete. In particular, the reception of the second portion 12 of the first output data 10 via the superordinate data path 212 is finished before the sending of the first portion 11 of the first output data 10 via the first subordinate data path 214 is finished. The reception of the second portion 12 of the first output data 10 may be finished at the same time as the sending of the first portion 11 of the first output data 10, for example.

Analogously to the reception of the second portion 12 of the first output data 10, the second portions 22, 32 of the second and third output data 20, 30 are each received by the network module 250 via the superordinate data path 212 during the sending of the first portions 21, 31 of the second and third output data 20, 30 via the second and third subordinate data paths 216, 218. In particular, the second portions 22, 32 of the second and third output data 20, 30 are received before the sending of the first portions 21, 31 of the second and third output data 20, 30 is complete. In particular, the reception of the second portions 22, 32 of the second and third output data 20, 30 via the superordinate data path 212 is in each case finished before the sending of the first portions 21, 31 of the second and third output data 20, 30 via the second and third subordinate data paths 216, 218 is finished. The reception of the second portions 22, 32 of the second and third output data 20, 30 may be in each case finished at the same time as the sending of the first portions 21, 31 of the second and third output data 20, 30, for example.

The network module 250 can send the second portion 12 of the first output data 10 via the first subordinate data path 214 immediately subsequently to the first portion 11 of the first output data 10 and can send the second portions 22, 32 of the second and third output data 20, 30 in each case immediately subsequently to the first portions 21, 31 of the second and third output data 20, 30.

Generally, during the sending of a portion 11, 12, 21, 22, 31, 32 of the output data 10, 20, 30 via the subordinate data paths 214, 216, 218, the network module 250 in each case receives the next portion 12, 13, 22, 23, 32, 33 of the output data 10, 20, 30 to be sent via the respective subordinate data path 214, 216, 218. The reception, via the superordinate data path 212, of the next portion 12, 13, 22, 23, 32, 33 of the output data 10, 20, 30 to be sent is then complete in each case before the sending of the respective previous portion 11, 12, 21, 22, 32, 33 of the output data 10, 20, 30 via the subordinate data path 214, 216, 218 has been finished. Moreover, during the sending of one of the portions 11, 12, 13 of the first output data 10 via the first subordinate data path 214, the network module 250 generally receives the applicable first portions 21, 22, 23, 31, 32, 33 of the remaining output data 20, 30 for the remaining subordinate data paths 216, 218. In particular, the network module 250 receives the first portions 21, 31 of the remaining output data 20, 30 during the sending of the first portion 11 of the first output data 10 via the first subordinate data path 214.

This general time characteristic can also be realized in other embodiments of the control system 200 in which the data network 210 comprises more than three or only two subordinate data paths connected to the network module 250. The time characteristic can also be realized if the output data 10, 20, 30 are each split only into two portions or into more than three portions.

Figure 6:
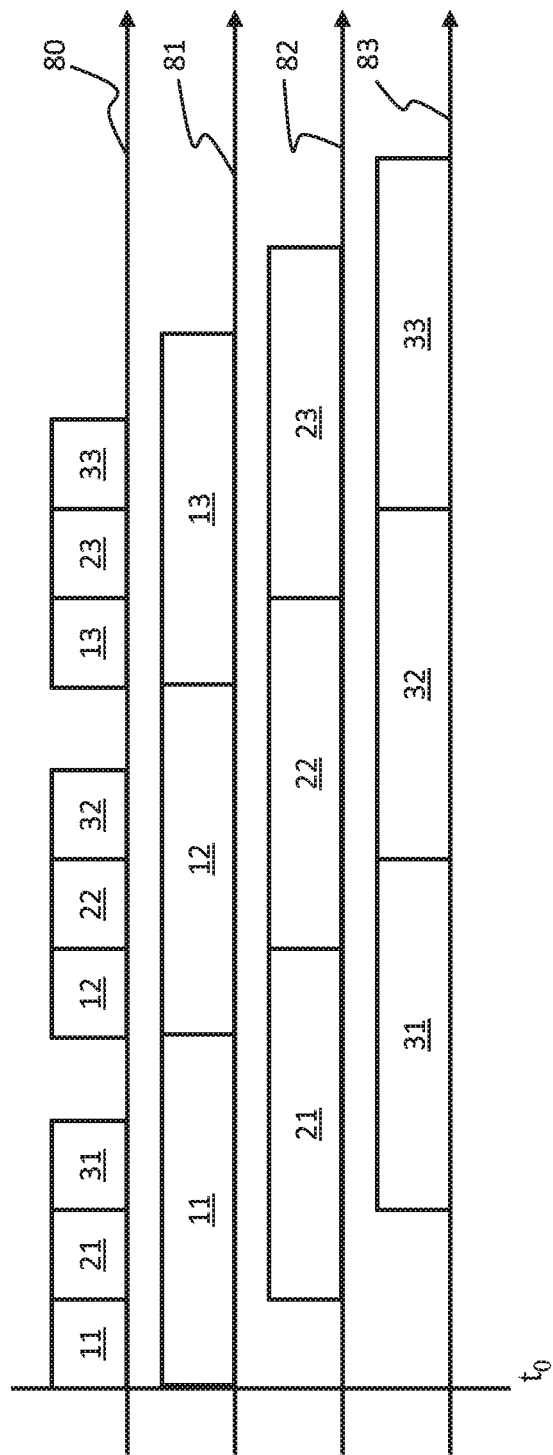
FIG. 6 shows a further time characteristic for the data transmission of output data via the network module.

FIG. 6 shows a further time characteristic for the data transmission via the network module 250. Insofar as no differences are described below, the depicted characteristic corresponds to the characteristic depicted in FIG. 5.

Unlike in the case of the characteristic depicted in FIG. 5, the network module 250 in the case of the characteristic depicted in FIG. 6 is configured to already send the output data 10, 20, 30 via the subordinate data paths 214, 216, 218 during the reception via the superordinate data path 212. Accordingly, the network module 250 begins to send the first portion 11 of the first output data 10 via the first subordinate data path 214 right at the beginning of the reception of the first portion 11 of the first output data 10 via the superordinate data path 212. The depiction in FIG. 6, like the depiction in FIG. 5 too, does not allow for a delay that can arise between the beginning of the reception of the output data 10, 20, 30 via the superordinate data path 212 and the beginning of the sending of the output data 10, 20, 30 via the subordinate data paths 214, 216, 218, for example caused by a non-negligible operating speed for splitting the output data 10, 20, 30 over the subordinate data paths 214, 216, 218.

Equally, the network module 250 begins to send the first portions 21, 31 of the second and third output data 20, 30 via the first and second subordinate data paths 216, 218 right at the beginning of the reception of the first portions 21, 31 of the second and third output data 20, 30 via the superordinate data path 212. Equally, the sending of the remaining portions 12, 22, 32, 13, 23, 33 of the first, second and third output data 10, 20, 30 via the subordinate data paths 214, 216, 218 is respectively begun as soon as the reception of the relevant portions 12, 22, 32, 13, 23, 33 via the superordinate data path 212 is begun.

In the case of the time characteristic for the data transmission that is depicted in FIG. 6 too, the reception of all the first portions 11, 21, 31 of the output data 10, 20, 30 via the superordinate data path 212 is complete before the sending of the first portion 11 of the first output data 10 via the first subordinate data path 214 is complete. The reception of all the first portions 11, 21, 31 of the output data 10, 20, 30 via the superordinate data path 212 is also complete before the sending of the first portions 21, 31 of the second and third output data 20, 30 via the second and third subordinate data paths 216, 218 is in each case complete. Equally, the transmission of all the second portions 12, 22, 32 of the output data 10, 20, 30 via the superordinate data path 212 is complete before the sending of the second portions 12, 22, 32 of the output data 10, 20, 30 via the subordinate data paths 214, 216, 218 is altogether complete. Equally, the transmission of all the third portions 13, 23, 33 of the output data 10, 20, 30 via the superordinate data path 212 is in each case complete before the sending of the third portions 13, 23, 33 of the output data 10, 20, 30 via the subordinate data paths 214, 216, 218 is altogether complete.

Figure 7:
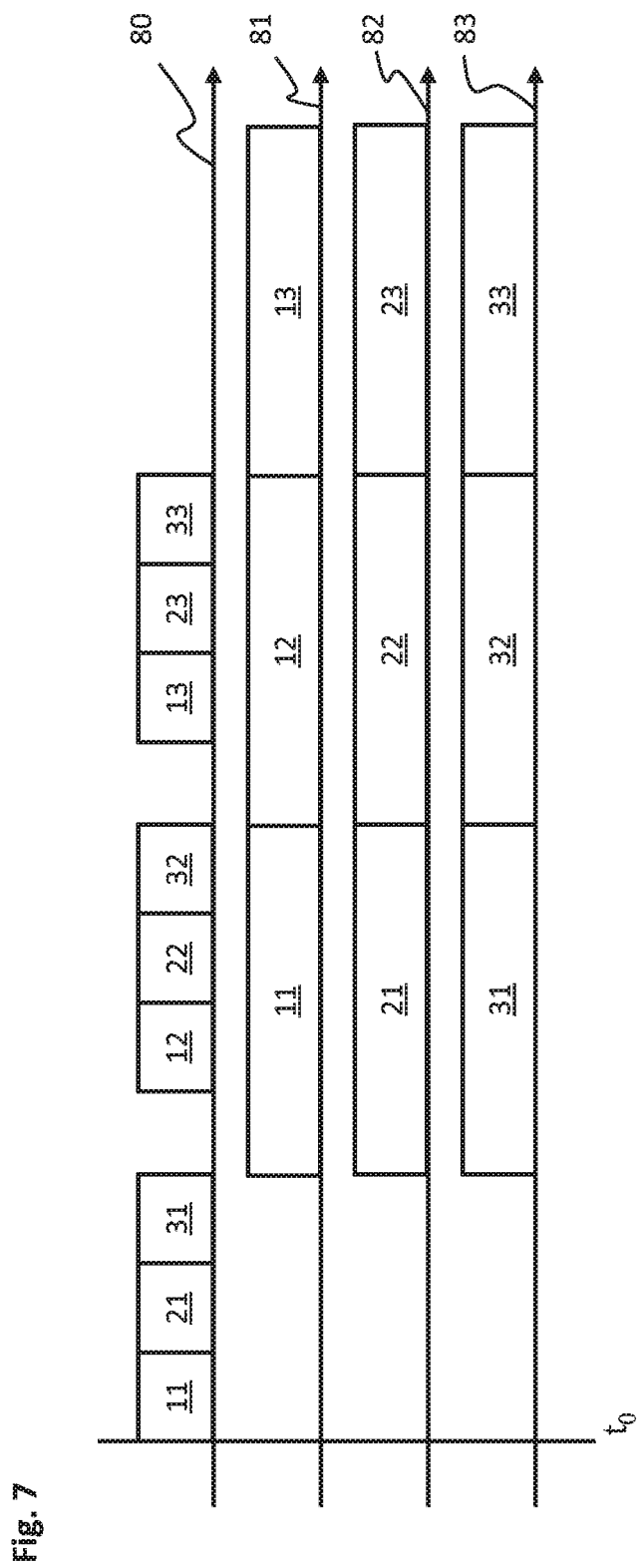
FIG. 7 shows a further time characteristic for the data transmission of output data via the network module.

FIG. 7 shows a further time characteristic for the data transmission of the output data 10, 20, 30 via the network module 250. Insofar as no differences are described below, the reception and sending of the output data 10, 20, 30 by the network module 250 are effected as described in connection with FIG. 5.

Unlike in the case of the characteristic shown in FIG. 5, the characteristic depicted in FIG. 7 involves the first portion 11 of the first output data 10 being sent from the network module 250 via the first subordinate data path 214 only if both the first portion 11 of the first output data 10 and the first portion 21 of the second output data 20 and the first portion 31 of the third output data 30 have been received by the network module 250 via the superordinate data path 212. The sending of the first portions 11, 21, 31 of the first, second and third output data 10, 20, 30 via the subordinate data paths 214, 216, 218 can then be begun at the same time. Equally, the second portions 12, 22, 32 and the third portions 13, 23, 33 of the output data 10, 20, 30 are sent via the subordinate data paths 214, 216, 218 only after all the second portions 12, 22, 32 and all the third portions 13, 23, 33 of the output data 10, 20, 30 have been fully received via the superordinate data path 212. The sending of the second portions 12, 22, 32 of the output data 10, 20, 30 and the sending of the third portions 13, 23, 33 of the output data 10, 20, 30 via the subordinate data paths 214, 216, 218 can then likewise each be begun at the same time.

In the case of the characteristic for the data transmission that is depicted in FIG. 7 too, the reception of all the first portions 11, 21, 31 of the output data 10, 20, 30 via the superordinate data path 212 is complete before the sending of the first portion 11 of the first output data 10 via the first subordinate data path 214 is complete. The reception of all the first portions 11, 21, 31 of the output data 10, 20, 30 via the superordinate data path 212 is also complete before the sending of the first portions 21, 31 of the second and third output data 20, 30 via the second and third subordinate data paths 216, 218 is complete. Equally, the transmission of all the second portions 12, 22, 32 of the output data 10, 20, 30 via the superordinate data path 212 is complete before the sending of the second portions 12, 22, 32 of the output data 10, 20, 30 via the subordinate data paths 214, 216, 218 is altogether complete. Equally, the transmission of all the third portions 13, 23, 33 of the output data 10, 20, 30 via the superordinate data path 212 is in each case complete before the sending of the third portions 13, 23, 33 of the output data 10, 20, 30 via the subordinate data paths 214, 216, 218 is altogether complete.

Figure 8:
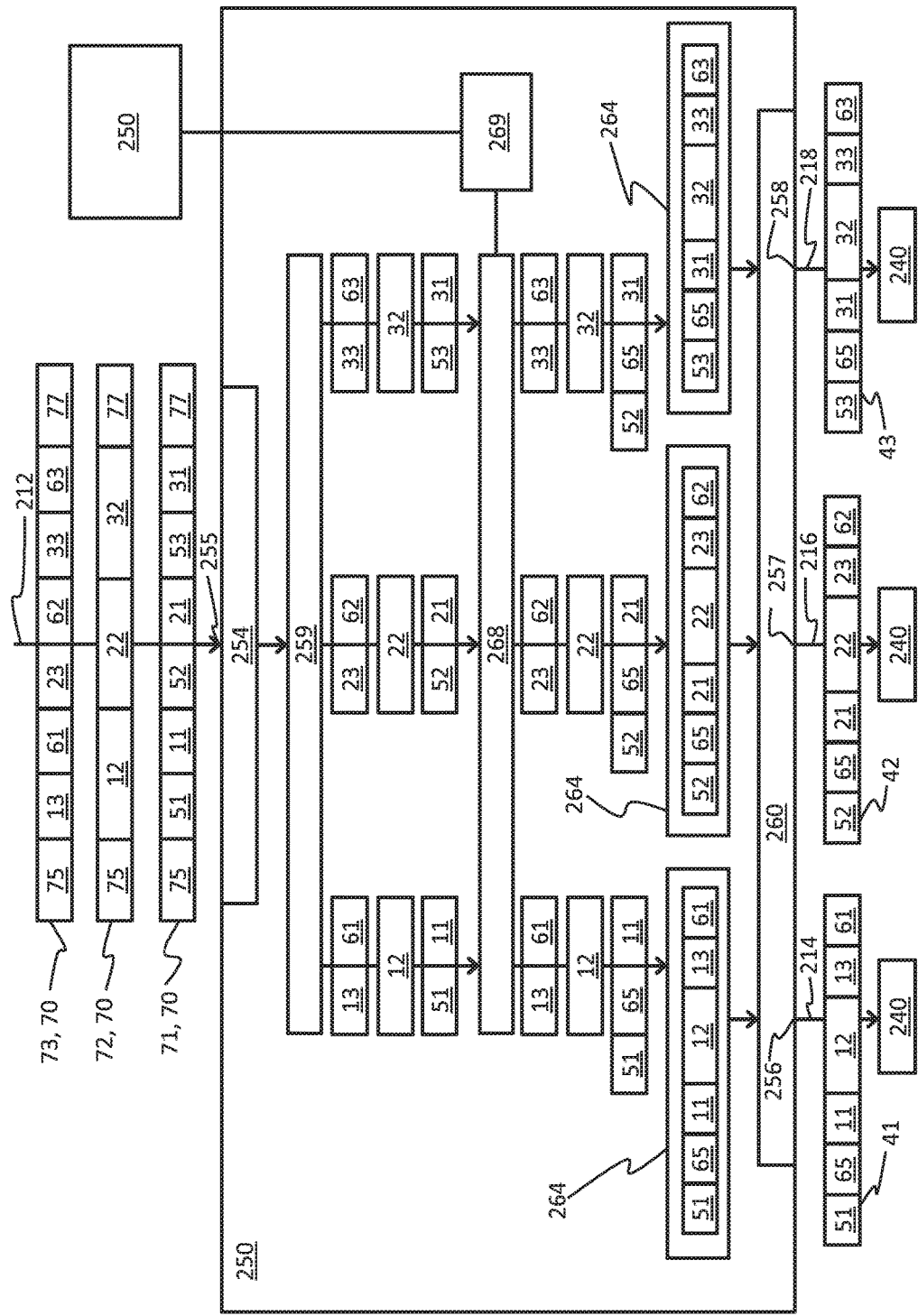
FIG. 8 shows a further embodiment of the network module and signal units of the control system.

FIG. 8 shows a further embodiment of the network module 250 with the signal units 240. Insofar as no differences are described below, the embodiment depicted in FIG. 8 is configured in exactly the same way as the embodiments of the network module 250 that are depicted in FIGS. 3 and 4.

The depicted network module 250 has a timer module 268. In the case of the depicted network module 250, the assignment module 259 is connected to the timer module 268 and the timer module 268 is connected to the output memories 264, so that the timer module 268 is arranged between the assignment module 259 and the output memories 264 or the communication module 260.

The timer module 268 is configured to provide each of the output data 10, 20, 30 with a piece of time information 65 during the communication cycle. On the basis of the time information 65, the signal units 240 of the first, second and third data paths 214, 216, 218 can be synchronized to a common time base, in particular to a reference time prescribed by the timer module 268. The synchronization of the signal units 240 can allow, for example, the output data 10, 20, 30 to be output via the signal units 240 connected to the first subordinate data path 214, the signal units 240 connected to the second subordinate data path 216 and the signal units 240 connected to the third subordinate data path 218 in a manner matched to one another in time, in particular at the same time. The synchronization can also be used to achieve the effect that the signal units 240 of all the subordinate data paths 214, 216, 218 each read in input data in a manner matched to one another in time, in particular the same time. The synchronization can also be used to achieve the effect of providing read-in input data with a standard system time that is identical throughout the control system 200.

By way of example, the time information 65 can be used to synchronize local timers of the signal units 240 to the common time base. By way of example, the time information 65 can be used to detect and equalize clock differences for the local timers in the signal units 240. The common time base can be prescribed by a local timer of the network module 250, for example. In particular, the timer of the network module 250 can prescribe the system time of the control system 200. The synchronization can in particular be effected based on the distributed clocks principle, for example in the case of subordinate data paths 214, 216, 218 operated based on the EtherCAT protocol.

The time information 65 may, by way of example, be chosen such that the first output data 10 from the signal units 240 of the first subordinate data path 214, the second output data 20 from the signal units 240 of the second subordinate data path 216 and the third output data 30 from the signal units 240 of the third subordinate data path 218 are output to the automation process at the same time.

By way of example, the timer module 268 can add the time information 65 to each of the first output data 10, the second output data 20 and the third output data 30. In particular, the timer module 268 can provide each of the first portions 11, 21, 31 of the first, second and third output data 10, 20, 30 with the time information 65.

The timer module 268 can also insert the time information 65 into the first, second and third output data 10, 20, 30, for example by at least partly overwriting each of the first, second and third output data 10, 20, 30. By way of example, the timer module 268 can insert the time information 65 into each of the first portions 11, 21, 31 of the first, second and third output data 10, 20, 30. The timer module 268 can alternatively insert the time information 65 into other portions 11, 12, 13, 21, 22, 23, 31, 32, 33 of the output data 10, 20, 30.

The timer module 268 can insert the time information 65 into the output data 10, 20, 30 in particular if the initial sequences 51, 52, 53 and/or the pieces of check information 61, 62, 63 are also transmitted via the superordinate data path 212 together with the output data, in particular if the data messages 41, 42, 43 for the subordinate data paths 214, 216, 218 are already fully transmitted via the superordinate data path 212.

By way of example, the timer module 268 can be prompted to provide the output data 10, 20, 30 with the time information 65 by a piece of information in the output data 10, 20, 30 or else by a piece of information in the initial sequences 51, 52, 53. The timer module 268 can evaluate the content of the output data 10, 20, 30 and/or the content of the initial sequences 51, 52, 53, for example.

The network module 250 can have a synchronization module 269 that is connected to the timer module 268. The synchronization module 269 may be connectable to a further synchronization module of a further network module 250. The further network module 250 is portrayed schematically at the top right in FIG. 8. The network module 250 and the further network module 250 may be configured identically. The network module 250 and the further network module 250 may both be connected to the control device 222 via a respective one of the superordinate data paths 212. In particular, the further network module 250 can interchange output data with the control device 222 and with signal units to which it is connected via subordinate data paths in the same way as is described in connection with the network module 250.

The synchronization module 269 is configured to prescribe the time information 65 or to influence the time information 65 output by the timer module 268. Moreover, the synchronization module 269 is configured to match the time information 65 to be prescribed to the time information 65 to be prescribed by the further synchronization module 269 of the further network module 250. The pieces of time information 65 prescribed by the synchronization module 269 and the further synchronization module 269 can be matched such that they are based on a common time base, for example, in particular such that both the signal units 240 connected to the network module 250 and the signal units 240 connected to the further network module 250 are each provided with a consistent time base or system time.

The communication module 260 may be configured to begin sending the output data 10, 20, 30 via the individual subordinate data paths 214, 216, 218, in particular sending the first portions 11, 21, 31 of the output data 10, 20, 30, in each case at the same time. The output data 10, 20, 30 can be sent via the first, the second and the third subordinate data path 214, 216, 218 at the same time in particular on the basis of the time information 65 prescribed by the timer module 268.

Figure 9:
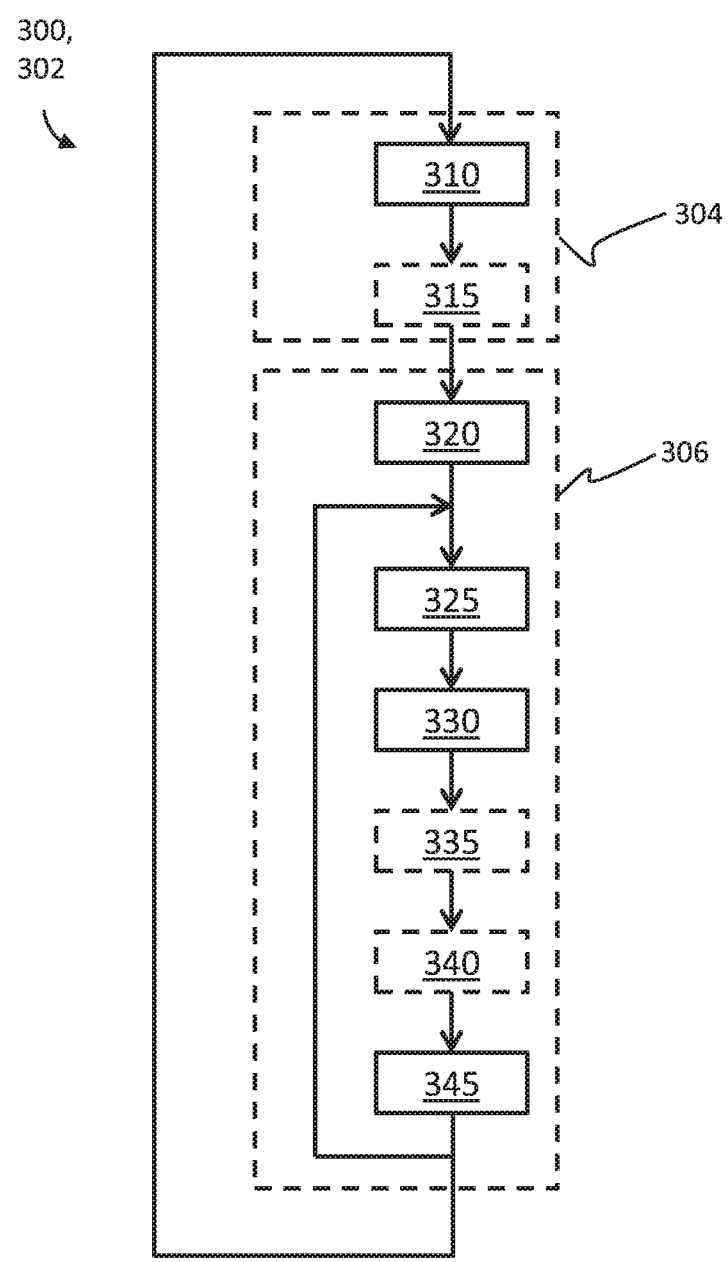
FIG. 9 shows a timing for a method for controlling an automation process.

FIG. 9 shows a schematic depiction of a timing for a method 300 for controlling an automation process by means of the described control system 200 as has already been described in connection with FIGS. 1 to 8.

The method 300 comprises successive control cycles 302, that are repeated cyclically and each comprise the computation cycle 304 and the communication cycle 306. During the computation cycle 304, in particular the control device 222 computes the output data 10, 20, 30. Moreover, the computation cycle 304 comprises providing 310 in the control device 222 the sum total of the first output data 10, the sum total of the second output data 20 and the sum total of the third output data 30 that are to be transmitted in the subsequent communication cycle 306 via the data network 210 to the signal units 240 connected to the subordinate data paths 214, 216, 218. The computation cycle 304 can also comprise computing 315 the pieces of check information 61, 62, 63 to secure the first, second and third output data 10, 20, 30 in the control device 222.

The communication cycle 306 comprises splitting 320 the output data 10, 20, 30 into the first portions 11, 21, 31, the second portions 12, 22, 32 and the third portions 13, 23, 33 in the control device 222. Depending on the volume of the output data 10, 20, 30 and the magnitude or length of the portions 11, 12, 13, 21, 22, 23, 31, 32, 33, the output data 10, 20, 30 can also just be split into two portions each or else into more than three portions. In particular if the data transmission rates on the subordinate data paths 214, 216, 218 are not of the same magnitude or if the sum totals of the first, second and third output data 10, 20, 30 are of different magnitude, the first output data 10, the second output data 20 and the third output data 30 can also be split into different numbers of portions.

The communication cycle 306 comprises transmitting 325, subsequently to the splitting 320, the output data 10, 20, 30 to the network module 250 via the superordinate data path 212, assigning 330 the output data 10, 20, 30 to the subordinate data paths 214, 216, 218 in the network module 250 and the network module 250 sending 345 the output data 10, 20, 30 via the subordinate data paths 214, 216, 218. The transmission 325 via the superordinate data path 212, assignment 330 and sending 345 are each performed for each portion 11, 12, 13, 21, 22, 23, 31, 32, 33 of the output data 10, 20, 30, as described in connection with FIGS. 5 to 7. As is likewise explained in said description, the timing of the sending 345 of the individual portions 11, 12, 13, 21, 22, 23, 31, 32, 33 of the output data 10, 20, 30 can in particular overlap that of the transmission 325 and the assignment 330 of the remaining portions 11, 12, 13, 21, 22, 23, 31, 32, 33, which means that the depiction in FIG. 9 depicts only the beginning of the sending 345 via the subordinate data paths 314, 316, 318 in each case.

The computation cycle 304 and the communication cycle 306 can be executed in succession. They may alternatively be executed with overlapping timing. By way of example, the first steps of the communication cycle 306, for example the splitting 320 of the output data 10, 20, 30 and the transmission 345 of portions of the output data 10, 20, 30 via the superordinate data path 212, can already be executed during the last steps of the computation cycle 304, for example during the provision 310 of the output data 10, 20, 30. In particular, the processing module 224 can still transmit output data 10, 20, 30 to the splitting module 228 while the first portions 11, 21, 31 of the output data 10, 20, 30 are already being split by the splitting module 228 and/or transmitted from the transmission module 230 to the network module 250 via the superordinate data path 212.

If appropriate, the assignment 330 to and the sending 345 via the subordinate data paths 214, 216, 218 can also be performed for the initial sequences 51, 52, 53 and/or the check information 61, 62, 63 for the data messages 41, 42, 43 of the subordinate data paths 214, 216, 218. It is also possible for the transmission 325 via the superordinate data path 212 to be performed for the initial sequences 51, 52, 53 and/or the check information 61, 62, 63 if appropriate.

The communication cycle 306 can also comprise the synchronization module 269 matching 335 the time information 65 to the further synchronization module 269 of the further network module 250, and the output data 10, 20, 30 being provided 340 with the time information 65. The matching 335 and the provision 340 with the time information 65 can be effected between the assignment 330 of the output data 10, 20, 30 to the subordinate data paths 214, 216, 218 and the sending 345 of the output data 10, 20, 30 via the subordinate data paths 214, 216, 218. It can alternatively be effected at other points in the method 300 in the network module 250 as soon as the output data 10, 20, 30 or the portions 11, 12, 13, 21, 22, 23, 31, 32, 33 thereof are present in the network module 250.

The signal units 240 may be configured to transmit input data to the control device 222 via the subordinate data paths 214, 216, 218, the network module 250 and the superordinate data path 212.

Figure 10:
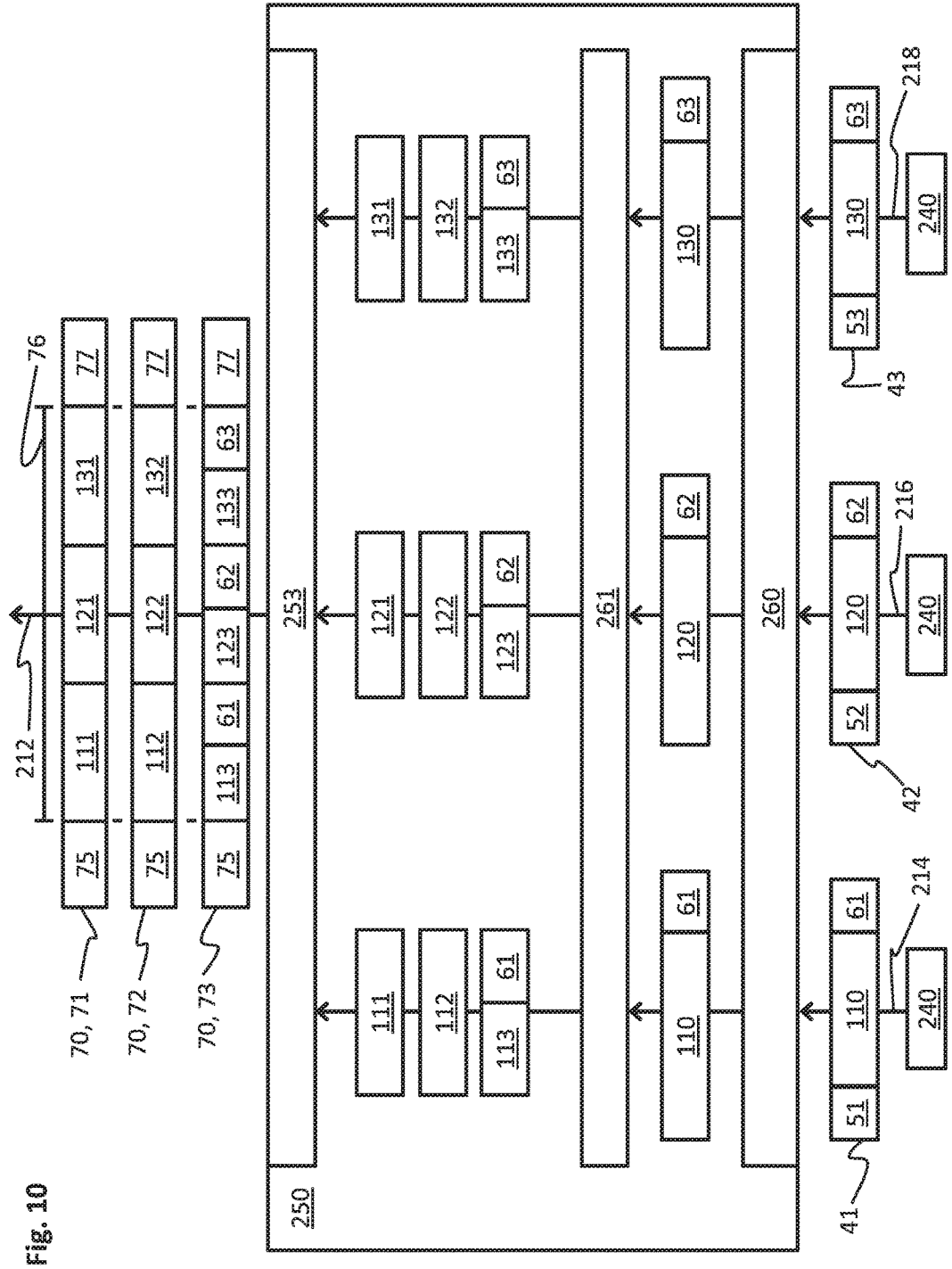
FIG. 10 shows a transmission of input data via the network module.

FIG. 10 shows a schematic depiction of the transmission of input data from the signal units 240 to the control device 222 via the network module 250. The signal units 240 connected to the first subordinate data path 214 transmit a sum total of first input data 110, the signal units 240 connected to the second subordinate data path 216 transmit a sum total of second input data 120 and the signal units 240 connected to the third subordinate data path 218 transmit a sum total of third input data 130 to the control device 222. The sum total of first input data 110, the sum total of second input data 120 and the sum total of third input data 130 each comprise all the input data that are transmitted to the control device 222 via the relevant subordinate data path 214, 216, 218 during the communication cycle.

The communication module 260 of the network module 250 receives the first input data 110 via the first subordinate data path 214, the second input data 120 via the second subordinate data path 216 and the third input data 130 via the third subordinate data path 218. The input data 110, 120, 130 can each be received in a data message having an initial sequence and a piece of check information via the subordinate data paths 214, 216, 218. In particular, the input data 110, 120, 130 can each be revived in the first, second and third data messages 41, 42, 43 previously sent with the output data 10, 20, 30 via the subordinate data paths 214, 216, 218 and returning to the network module 250. In this case, the data messages 41, 42, 43 can additionally comprise the first, second and third initial sequences 51, 52, 53, respectively.

The signal units 240 may be configured to add a first piece of check information 61, a second piece of check information 62 and a third piece of check information 63 to each of the first, second and third input data 110, 120, 130. The first, second and third pieces of check information 61, 62, 63 can each be computed on the basis of the first, second and third input data 110, 120, 130, respectively. Analogously to the checking of the output data 10, 20, 30 on the basis of the check information transmitted with the output data 10, 20, 30, the control device 222 can use the check information 61, 62, 63 to detect a distortion or a loss of input data 110, 120, 130 during the transmission via the data network 210 and the network module 250.

The communication module 260 is connected to a resolution module 261, for example via a memory module, for example a first-in-first-out memory module (FIFO memory module). The resolution module 261 is configured to resolve the input data 110, 120, 130 received via the subordinate data paths 214, 216, 218 into individual portions that are each separately transmitted to the control device 222 via the superordinate data path 212. By way of example, the resolution module 261 may be configured to resolve the first input data 110 into a first portion 111, a second portion 112 and a third portion 113, the second input data 120 into a first portion 121, a second portion 122 and a third portion 123 and the third input data 130 into a first portion 131, a second portion 132 and a third portion 133.

In this case, the input data 110, 120, 130 are resolved in the order of their reception on the individual subordinate data paths 214, 216, 218 into the portions 111, 112, 113, 121, 122, 123, 131, 132, 133. Thus, the first portion 111, the second portion 112 and the third portion 113 of the first input data 110 have been received in succession via the first subordinate data path 214, the first portion 121, the second portion 122 and the third portion 123 of the second input data 120 have been received in succession via the second subordinate data path 216 and the first portion 131, the second portion 132 and the third portion 133 of the third input data 130 have been received in succession via the third subordinate data path 218.

The resolution module 261 may be configured to produce each of the first portions 111, 121, 131 of the input data 110, 120, 130 as soon as a respective stipulated volume of the input data 110, 120, 130 has been received via the subordinate data paths 214, 216, 218. In particular, the resolution module 261 may be configured to produce the first portions 111, 121, 131 while other portions of the input data 110, 120, 130 are still being received via the subordinate data paths 214, 216, 218. Analogously, the resolution module 261 may be configured to produce each of the second portions 112, 122, 132 and the third portions 113, 123, 133 insofar as a respective volume of input data 110, 120, 130 stipulated for these portions 112, 122, 132, 113, 123, 133 has been received and while other portions of the input data 110, 120, 130 are still being received via the subordinate data paths 214, 216, 218.

The same volume of data may have been stipulated for each of the individual portions 111, 112, 113 of the first input data 110. Equally, the same volume of data may have been stipulated for each of the individual portions 121, 122, 123 of the second input data 120, and, in exactly the same way, for the individual portions 131, 132, 133 of the third input data 130. It is also possible for the same volume of data to have been stipulated for the portions 111, 112, 113, 121, 122, 123, 131, 132, 133 of all the input data 110, 120, 130, in particular if the transmission rates on the subordinate data paths 214, 216, 218 are of the same magnitude. The ratio of the volume of data that is stipulated for the portions 111, 112, 113, 121, 122, 123, 131, 132, 133 of the input data 110, 120, 130 of one of the subordinate data paths 214, 216, 218 to the volume of data that is stipulated for the portions 111, 112, 113, 121, 122, 123, 131, 132, 133 of the input data 110, 120, 130 of another of the subordinate data paths 214, 216, 218 can also correspond to the ratio of the data transmission rate on one of the subordinate data paths 214, 216, 218 to the data transmission rate on the other of the data paths 214, 216, 218, in particular if the data transmission rates are not the same.

Each of the pieces of check information 61, 62, 63 can be appended to one of the portions 111, 112, 113, 121, 122, 123, 131, 132, 133 of the input data 110, 120, 130, for example in each case to the third portion 113, 123, 133 of the input data 110, 120, 130. The volume of data of the relevant portions 111, 112, 113, 121, 122, 123, 131, 132, 133 of the input data 110, 120, 130, for example in each case the third portions 113, 123, 133 of the input data 110, 120, 130, may then have been stipulated in a fashion such that the volumes of data of the relevant portions 111, 112, 113, 121, 122, 123, 131, 132, 133 of the input data 110, 120, 130 and of the check information 61, 62, 63 together correspond to the volumes of data stipulated for each of the remaining portions 111, 112, 113, 121, 122, 123, 131, 132, 133 of the first, second and third input data 110, 120, 130.

A transmission module 253 of the network module 250 is connected to the superordinate data path 212 and configured to transmit the input data 110, 120, 130 to the control device 222 via the superordinate data path 212. In this case, the transmission module 253 is configured to already transmit the first portions 111, 121, 131 of the input data 110, 120, 130 via the superordinate data path 212 while remaining portions 112, 113, 121, 122, 132, 133 of the input data 110, 120, 130, for example the second portions 112, 122, 132 and/or the third portions 113, 123, 133, are still being received via the subordinate data paths 214, 216, 218.

The transmission module 253 may be configured to transmit each of the portions 111, 112, 113, 121, 122, 123, 131, 132, 133 of the input data 110, 120, 130 to the control device 222 by means of data packets 70 of the superordinate data path 212. By way of example, the transmission module 253 may be configured to transmit the first portions 111, 121, 131 of the first, second and third output data 110, 120, 130 together in a first data packet 71, the second portions 112, 122, 132 of the output data 110, 120, 130 together in a second data packet 72 and the third portions 113, 123, 133 of the output data 110, 120, 130 together in a third data packet 73. The data packets 70 may be configured like the data packets 70 used for transmitting the output data 10, 20, 30 and, in particular, may also each comprise a header section 75, an end section 77 and a data section 76 with the input data 110, 120, 130 and the check information 61, 62, 63.

Alternatively, the transmission module 253 may also be configured to transmit each of the individual portions 111, 112, 113, 121, 122, 123, 131, 132, 133 of the input data 110, 120, 130 in a separate data packet 70 via the superordinate data path 212 or else to distribute the portions 111, 112, 113, 121, 122, 123, 131, 132, 133 of the input data 110, 120, 130 over the data packets 70 in another way.

The volumes of data stipulated for the portions 111, 112, 113, 121, 122, 123, 131, 132, 133 of the input data 110, 120, 130 may be chosen such that the superordinate data path 212 is utilized to an optimum degree during the transmission in the same way as described in connection with the transmission of the output data 10, 20, 30. In particular, for a superordinate data path 212 based on the PCI Express protocol, the volumes of data may be chosen such that the data sections 76 of the data packets 70 each have a length of 512 bytes. When there are three subordinate data paths 214, 216, 218, the volumes of data may in particular each be 170 bytes.

In the same way as for the length of the portions 11, 12, 13, 21, 22, 23, 31, 32, 33 of the output data 10, 20, 30, it is also possible for the length of each of the portions 111, 112, 113, 121, 122, 123, 131, 132, 133 of the input data 110, 120, 130 to be stored in the network module 250 and the control device 222 and/or to be stipulated on the basis of information interchanged between the control device 222 and the network module 250.

The transmission module 253 may be configured to transmit the portions 111, 112, 113, 121, 122, 123, 131, 132, 133 of the input data 110, 120, 130 via the superordinate data path 212 according to the first-come-first-served principle in the order of their reception via the subordinate data paths 214, 216, 218. The transmission module 253 may additionally or alternatively be configured to transmit first of all one of the portions 111, 112, 113 of the first input data 110, for example the first portion 111, subsequently an applicable one of the portions 121, 122, 123 of the second input data 120, for example the first portion 121, and subsequently an applicable one of the portions 131, 132, 133 of the third input data 130, for example the first portion 131. This can be done in particular even if portions 111, 112, 113, 121, 122, 123, 131, 132, 133 of the input data 110, 120, 130 are received via two different subordinate data paths 214, 216, 218 at the same time.

In particular, the transmission module 253 can successively transmit the first portion 111 of the first input data 110, the first portion 121 of the second input data 120, the first portion 131 of the third input data 130, the second portion 112 of the first input data 110, the second portion 122 of the second input data 120, the second portion 132 of the third input data 130, the third portion 113 of the first input data 110, if appropriate together with the first piece of check information 61, the third portion 123 of the second input data 120, if appropriate together with the second piece of check information 62 and the third portion 133 of the third input data 130, if appropriate together with the third piece of check information 63.

The transmission module 253 may also be configured to mark each of the portions 111, 112, 113, 121, 122, 123, 131, 132, 133 of the input data 110, 120, 130 with an identifier or piece of origin information that indicates via which of the subordinate data paths 214, 216, 218 the relevant portion 111, 112, 113, 121, 122, 123, 131, 132, 133 of the input data 110, 120, 130 has been received in each case. In this case, the transmission module may in particular be configured to transmit the portions 111, 112, 113, 121, 122, 123, 131, 132, 133 of the input data 110, 120, 130 via the superordinate data path 212 without a stipulated order. Such transmission of the portions 111, 112, 113, 121, 122, 123, 131, 132, 133 of the input data 110, 120, 130 in an open order can be effected in particular if the transmission of the data messages 41, 42, 43 on the individual subordinate data paths 214, 216, 218 takes a different length of time in each case, for example on account of different transmission rates and/or a different number of connected signal units 240.

The transmission module 253, the reception module 254, the assignment module 259, the communication module 259, the resolution module 261, the timer module 268 or the synchronization module 269 may each be configured as software modules or as program modules that are executed on a computation unit of the network module 250, for example on an FPGA or a microprocessor. They may alternatively be configured as hardware chips of the network modules 250. In particular, the transmission module 253 and/or the reception module 254 may be arranged in a protocol chip of the network module 250. Analogously, the communication module 260 may be arranged in a protocol chip or in protocol chips of the subordinate data paths 214, 216, 218.

Figure 11:
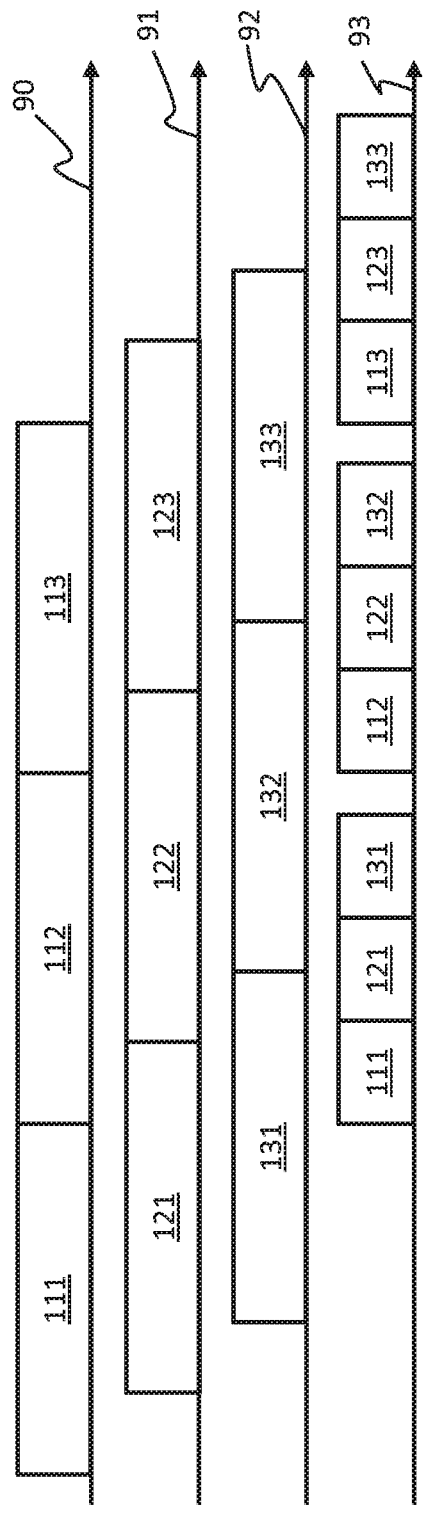
FIG. 11 shows a time characteristic for the data transmission of input data via the network module.

FIG. 11 depicts a time characteristic for the reception of the input data 110, 120, 130 via the subordinate data paths 214, 216, 218 and the transmission of the input data 110, 120, 130 via the superordinate data path 212 by the network module 250. There are depicted on a first time axis 90 the time characteristic for the reception of the first input data 110 via the first subordinate data path 214, on a second time axis 91 the time characteristic for the reception of the second input data 120 via the second subordinate data path 216, on a third time axis 92 the time characteristic for the reception of the third input data 130 via the third subordinate data path 218 and on a fourth time axis 93 the time characteristic for the transmission of the first, second and third input data 110, 120, 130 via the superordinate data path 212.

For the sake of simplicity, FIG. 11 does not depict the reception and sending of the control information shown elsewhere, in particular the initial sequences 51, 52, 53, the header sections 75 and the end sections 77, or the reception and sending of the check information 61, 62, 63.

First of all, the first portions 111, 121, 131 of the input data 110, 120, 130 are received via each of the subordinate data paths 214, 216, 218. Immediately subsequently to each of the first portions 111, 121, 131, the second portions 112, 122, 132 are received, and immediately subsequently to each of the second portions 112, 122, 132, the third portions 113, 123, 133 of the input data 110, 120, 130 are received. In this case, the reception on the individual subordinate data paths 214, 216, 218 can take place with staggered timing, as depicted in FIG. 11. Alternatively, it can take place at the same time on some of the subordinate data paths 214, 216, 218 or on all of the subordinate data paths 214, 216, 218.

As soon as the first portion 111 of the first input data 110 has been received, it begins to be transmitted via the superordinate data path 212. While the first portion 111 of the first input data 110 is transmitted via the superordinate data path 212, the second portion 112 of the first input data 110 is received via the first subordinate data path 214. Since the data transmission rate on the superordinate data path 212 is higher than the data transmission rate on the subordinate data paths 214, 216, 218, the transmission of the first portion 111 of the first input data 110 via the superordinate data path 212 requires less time than the reception of the second portion 112 of the first input data 110. Therefore, the transmission of the first portion 121 of the second input data 120 can be begun after the first portion 121 of the second input data 120 has been received fully and while the second portion 112 of the first input data 110 is still being received.

Since the data transmission rate on the superordinate data path 212 is higher than the sum of the data transmission rates on the subordinate data paths 214, 216, 218, the transmission of the first portions 111, 121 of the first and second input data 110, 120 via the superordinate data path 212 requires less time than the reception of the second portion 112 of the first input data 110 via the first subordinate data path 214. Therefore, the transmission of the first portion 131 of the third input data 130 can be begun after the first portion 131 of the third input data 130 has been received fully and while the second portion 112 of the first input data 110 is still being received.

Analogously to the transmission of the first portions 111, 121, 131 of the input data 110, 120, 130 via the superordinate data path 212, the transmission of the second portions 112, 122, 132 of the input data 110, 120, 130 via the superordinate data path 212 takes place during the reception of the third portion 113 of the first input data 110 via the first subordinate data path 214.

The transmission of the portions 111, 112, 113, 121, 122, 123, 131, 132, 133 of the input data 110, 120, 130 via the superordinate data path 212 can also be begun in each case while the relevant portion 111, 112, 113, 121, 122, 123, 131, 132, 133 of the input data 110, 120, 130 is still being received via the respective subordinate data path 214, 216, 218. In particular, the transmission of each of the portions 111, 112, 113, 121, 122, 123, 131, 132, 133 of the input data 110, 120, 130 can be begun at the same time as the beginning of the reception of the relevant portion 111, 112, 113, 121, 122, 123, 131, 132, 133 of the input data 110, 120, 130 via the respective subordinate data path 214, 216, 218.

The transmission of all the first portions 111, 121, 131 of the input data 110, 120, 130 via the superordinate data path 212 can also be begun while the first portion 111 of the first output data 110 is still being received via the first subordinate data path 214.

The transmission of all the first portions 111, 121, 131 of the input data 110, 120, 130 via the superordinate data path 212 can in particular be begun before the reception of the second portion 112 of the first input data 110 via the first subordinate data path 214 has been finished.

In the case of the control system 200, the latency of the data transmission both for the transmission of the output data 10, 20, 30 from the control device 222 to the signal units 240 and for the transmission of the input data 110, 120, 130 from the signal units 240 to the control device 222 is reduced in comparison with a system in which first of all the sum total of first output data 10, subsequently the sum total of second output data 20 and then the sum total of third output data 30 or first of all the sum total of first input data 110, subsequently the sum total of second input data 120 and subsequently the sum total of third input data 130 are each transmitted via the superordinate data path 212 as a whole.

In the case of the control system 200, a reduction in the latency for the transmission of the output data 10, 20, 30 is achieved by virtue of the output data 10, 20, 30 each being split into individual portions 11, 12, 13, 21, 22, 23, 31, 32, 33 before the transmission via the superordinate data path 212 and first of all one of the portions 11, 12, 13 of the first output data 10, one of the portions 21, 22, 23 of the second output data 20 and one of the portions 31, 32, 33 of the third output data 30 each being transmitted to the network module 250 via the superordinate data path 212. The network module 250 can already begin sending the transmitted portions 11, 21, 31 via the subordinate data paths 214, 216, 218 while the next one of the portions 11, 12, 13 of the first output data 10, the next one of the portions 21, 22, 23 of the second output data 20 and the next one of the portions 31, 32, 33 of the third output data 30 are each transmitted to the network module 250 via the superordinate data path 212. Immediately subsequently to the sending of the first ones of the portions 11, 21, 31 of the output data 10, 20, 30, the network module 250 can begin sending the next ones of the portions 12, 22, 32 of the output data 10, 20, 30. This is repeated until all the portions 11, 12, 13, 21, 22, 23, 31, 32, 33 of the output data 10, 20, 30 have been transmitted to the signal units 240 via the data network 210.

In the case of the control system 200, it is in particular possible during the sending of the output data 10, 20, 30 on each of the subordinate data paths 214, 216, 218 for output data 10, 20, 30 for all of the subordinate data paths 214, 216, 218 to be transmitted via the superordinate data path 212 at the same time. The transmission of the output data 10, 20, 30 on the superordinate data path 212 and the sending of the output data 10, 20, 30 via all the subordinate data paths 214, 216, 218 can take place more or less simultaneously.

Analogously, a reduction in the latency for the transmission of the input data 110, 120, 130 via the data network 210 is achieved by virtue of the input data 110, 120, 130 each being split into individual portions 111, 112, 113, 121, 122, 123, 131, 132, 133 after the reception via the subordinate data paths 214, 216, 218 and first of all one of the portions 111, 112, 113 of the first input data 110, one of the portions 121, 122, 123 of the second input data 120 and one of the portions 131, 132, 133 of the third input data 130 each being transmitted to the control device 222 via the superordinate data path 212. The network module 250 can already begin transmitting the first ones of the portions 111, 112, 113, 121, 122, 123, 131, 132, 133 of the input data 110, 120, 130 via the superordinate data path 212 while, immediately subsequently to the first ones of the portions 111, 112, 113, 121, 122, 123, 131, 132, 133 of the input data 110, 120, 130, it receives a next one of the portions 111, 112, 113 of the first input data 110, a next one of the portions 121, 122, 123 of the second input data 120 and a next one of the portions 131, 132, 133 of the third input data 130 from the signal units 240 via the subordinate data paths 214, 216, 218.

After the transmission of each of the portions 111, 121, 131 of the input data 110, 120, 130 from each subordinate data path 214, 216, 218, the network module 250 can begin transmitting each next one of the portions 112, 122, 132 of the input data 110, 120, 130 from each subordinate data path 214, 216, 218. This is repeated until all the portions 111, 112, 113, 121, 122, 123, 131, 132, 133 of the input data 110, 120, 130 have been transmitted to the control device 222 via the data network 210.

In the case of the control system 200, it is in particular possible during the reception of the input data 110, 120, 130 at the same time on all the subordinate data paths 214, 216, 218 for portions 111, 112, 113, 121, 122, 123, 131, 132, 133 of input data 110, 120, 130 from each of the subordinate data paths 214, 216, 218 to be transmitted on the superordinate data path 212. The transmission of the input data 110, 120, 130 on the superordinate data path 212 and the reception of the input data 110, 120, 130 via all the subordinate data paths 214, 216, 218 can therefore take place more or less simultaneously.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

What is claimed is:

1. A method for controlling an automation process via a data network of a control system,
   wherein the control system comprises a control device, a network module connected to the control device via a superordinate data path and signal units connected to the network module via subordinate data paths,
   wherein the sum of the transmission rates on the subordinate data paths corresponds to no more than the transmission rate on the superordinate data path,
   wherein the subordinate data paths comprise at least a first subordinate data path and a second subordinate data path,
   wherein the method comprises successive control cycles that each comprise a computation cycle and a communication cycle,
   wherein the computation cycle comprises the following steps:
      providing in the control device a sum total of first output data transmitted in the communication cycle from the control device to the signal units connected to the first subordinate data path,
      providing in the control device a sum total of second output data transmitted in the communication cycle from the control device to the signal units connected to the second subordinate data path,
   wherein the communication cycle comprises the following steps:
      splitting the first output data into at least a first portion and a second portion in the control device,
      splitting the second output data into at least a first portion and a second portion in the control device,
      transmitting the first portion of the first output data from the control device to the network module via the superordinate data path,
      transmitting the first portion of the second output data from the control device to the network module via the superordinate data path after the transmission of the first portion of the first output data,
      transmitting the second portion of the first output data from the control device to the network module via the superordinate data path after the transmission of the first portion of the second output data, transmitting the second portion of the second output data from the control device to the network module via the superordinate data path after the transmission of the second portion of the first output data, the network module sending the first portion of the first output data via the first subordinate data path, the network module sending the first portion of the second output data via the second subordinate data path, the network module sending the second portion of the first output data via the first subordinate data path, the network module sending the second portion of the second output data via the second subordinate data path.

2. The method according to claim 1, wherein the sending of the first portion of the second output data via the second subordinate data path is begun before the end of the transmission of the second portion of the first output data via the superordinate data path.

3. The method according to claim 1,
wherein the first portion of the first output data and the first portion of the second output data are transmitted from the control device to the network module in a first data packet of the superordinate data path,
wherein the second portion of the first output data and the second portion of the second output data are transmitted from the control device to the network module in a second data packet of the superordinate data path.

4. The method according to claim 1,
wherein the sending of the second portion of the first output data via the first subordinate data path is effected immediately subsequently to the sending of the first portion of the first output data, and
wherein the sending of the second portion of the second output data via the second subordinate data path is effected immediately subsequently to the sending of the first portion of the second output data.

5. The method according to claim 4,
wherein the sending of the first portion of the first output data via the first subordinate data path is effected as a first section of a first data message for the first subordinate data path,
wherein the sending of the second portion of the first output data via the first subordinate data path is effected as a second section of the first data message,
wherein the sending of the first portion of the second output data via the second subordinate data path is effected as a first section of a second data message for the second subordinate data path,
wherein the sending of the second portion of the second output data via the second subordinate data path is effected as a second section of the second data message.

6. The method according to claim 5, wherein the communication cycle comprises the further steps of:
transmitting a first initial sequence from the control device to the network module via the superordinate data path,
transmitting a second initial sequence from the control device to the network module via the superordinate data path,
sending the first initial sequence as part of the first data message before sending the first portion of the first output data via the first subordinate data path, and
sending the second initial sequence as part of the second data message before sending the first portion of the second output data via the second subordinate data path.

7. The method according to claim 1,
wherein the first portion of the first output data is marked with a first piece of address information during the splitting of the first output data, and
wherein the first portion of the second output data is marked with a second piece of address information during the splitting of the second output data,
wherein the communication cycle comprises the further steps of:
assigning the first portion of the first output data for the sending via the first subordinate data path on the basis of the first piece of address information in the network module,
assigning the first portion of the second output data for the sending via the second subordinate data path on the basis of the second piece of address information in the network module.

8. The method according to claim 7, wherein the first and second pieces of address information are formed by a position of the first portions of the first and second output data within a data packet of the superordinate data path that is transmitted via the superordinate data path.

9. The method according to claim 1,
wherein the computation cycle comprises the further steps of:
computing a first piece of check information on the basis of the sum total of the first output data in the control device,
computing a second piece of check information on the basis of the sum total of the second output data in the control device,
wherein the communication cycle comprises the further steps of:
transmitting the first piece of check information to the network module via the superordinate data path,
sending the first piece of check information via the first subordinate data path for checking by the signal units connected to the first subordinate data path,
transmitting the second piece of check information to the network module via the superordinate data path,
sending the second piece of check information via the second subordinate data path for checking by the signal units connected to the second subordinate data path.

10. The method according to claim 1, wherein the transmission of the first portion of the first output data via the superordinate data path is begun before the provision of the sum total of the output data to be transmitted in the communication cycle in the control device has been finished.

11. The method according to claim 1, wherein the communication cycle comprises the further steps of:
the network module receiving via the first subordinate data path a first portion of a sum total of first input data transmitted in the communication cycle from the signal units connected to the first subordinate data path to the control device,
the network module receiving via the second subordinate data path a first portion of a sum total of second input data transmitted in the communication cycle from the signal units connected to the second subordinate data path to the control device,
transmitting the first portion of the first input data from the network module to the control device via the superordinate data path,
transmitting the first portion of the second input data from the network module to the control device via the superordinate data path, the network module receiving a second portion of the first input data via the first subordinate data path after the reception of the first portion of the first input data, the network module receiving a second portion of the second input data via the second subordinate data path after the reception of the first portion of the second input data, transmitting the second portion of the first input data from the network module to the control device via the superordinate data path after the transmission of the first portions of the first and second input data, transmitting the second portion of the second input data from the network module to the control device via the superordinate data path after the transmission of the first portions of the first and second input data.

12. The method according to claim 10, wherein the first portion of the first input data and the first portion of the second input data are transmitted in a data packet of the superordinate data path, wherein the second portion of the first input data and the second portion of the second input data are transmitted in a further data packet of the superordinate data path.

13. The method according to claim 10, wherein the transmission of the input data is begun as soon as a stipulated volume of data for input data has been received by the network module via the subordinate data paths.

14. The method according to claim 1, wherein the communication cycle comprises the further step of:

providing the first output data and the second output data with a piece of time information in the network module in order to synchronize the signal units of the first subordinate data path and the signal units of the second subordinate data path to a common time base.

15. The method according to claim 13, wherein the method comprises the further step of:

matching the piece of time information to a further piece of time information of a further network module of the control system.

16. The method according to claim 1, wherein the sum total of the first output data is split into a plurality of portions during the communication cycle, wherein the sum total of the second output data is split into a plurality of portions during the communication cycle, wherein during the communication cycle one of the portions of the first output data and one of the portions of the second output data are successively transmitted, in each case alternately, from the control device to the network module via the superordinate data path, wherein during the communication cycle the portions of the first output data are successively sent from the network module via the first subordinate data path and the portions of the second output data are successively sent from the network module via the second subordinate data path.

17. The method according to claim 1, wherein the signal units are connected to the network module via a plurality of subordinate data paths, wherein during the computation cycle all the respective output data to be transmitted to the signal units of the relevant subordinate data path in the control cycle are provided for each of the subordinate data paths in the control device, wherein during the communication cycle the output data provided for each of the individual subordinate data paths are each split into a plurality of portions, wherein during the communication cycle a respective one of the portions of the output data provided for each of the individual subordinate data paths is successively transmitted from the control device to the network module via the superordinate data path, wherein the transmission of a respective one of the portions of the output data provided for each of the individual subordinate data paths from the control device to the network module via the superordinate data path is repeated until all the portions of the output data are transmitted.

18. A control system for controlling an automation process via a data network having a control device, a network module and signal units, wherein the network module is connectable to the control device via a superordinate data path of the data network, wherein the network module is connectable to the signal units via subordinate data paths of the data network, wherein the sum of the transmission rates on the subordinate data paths corresponds to no more than the transmission rate on the superordinate data path, wherein the subordinate data paths comprise at least a first subordinate data path and a second subordinate data path, wherein the control device comprises a processing module, a splitting module and a transmission module, wherein the network module comprises an assignment module and a communication module, wherein the control device is configured to control the automation process in successive control cycles, wherein each of the control cycles comprises a computation cycle and a communication cycle, wherein the processing module is configured to compute and provide, during the computation cycle, a sum total of first output data transmitted in the communication cycle from the control device to the signal units connected to the first subordinate data path and a sum total of second output data transmitted in the communication cycle from the control device to the signal units connected to the second subordinate data path, wherein the splitting module is configured to split, during the communication cycle, the first output data into a first portion and into a second portion and the second output data into a first portion and into a second portion, wherein the transmission module is configured to transmit, during the communication cycle, first the first portion of the first output data, subsequently the first portion of the second output data, subsequently the second portion of the first output data and subsequently the second portion of the second output data to the network module via the superordinate data path, wherein the assignment module is configured to assign the first portion of the first output data to the first subordinate data path and the first portion of the second output data to the second subordinate data path, wherein the communication module is configured to send the first portion of the first output data via the first subordinate data path and the first portion of the second output data via the second subordinate data path, wherein the assignment module is configured to assign the second portion of the first output data to the first subordinate data path and the second portion of the second output data to the second subordinate data path, wherein the communication module is configured to send the second portion of the first output data via the first subordinate data path immediately subsequently to the first portion of the first output data, and the second portion of the second output data via the second subordinate data path immediately subsequently to the first portion of the second output data.

19. The control system according to claim 18,
wherein the control device and the network module are arranged in a common housing composite,
wherein the superordinate data path is configured as an internal data bus within the housing composite, in particular as a PCI Express bus.

20. The control system according to claim 18,
wherein the control of the automation process comprises actuation of a linear motor,
wherein the signal units are configured as coil actuation units for applying a drive signal to drive coils of the linear motor,
wherein the coil actuation units are configured to generate the drive signal on the basis of the output data.

21. A network module for a control system for controlling an automation process via a data network that comprises a superordinate data path and subordinate data paths,
wherein the sum of the transmission rates on the subordinate data paths corresponds to no more than the transmission rate on the superordinate data path,
wherein the subordinate data paths comprise at least a first subordinate data path and a second subordinate data path,
wherein the network module has
   a superordinate interface for connection to a control device of the control system via the superordinate data path,
   a first subordinate interface for connection to signal units of the control system via the first subordinate data path,
   a second subordinate interface for connection to signal units of the control system via the second subordinate data path, and
   a reception module, an assignment module and a communication module,
wherein the reception module is configured to receive, during a communication cycle of a control cycle of the control system, via the superordinate interface, a first portion of a sum total of first output data transmitted in the communication cycle from the control device to the signal units connected to the first subordinate data path and a first portion of a sum total of second output data transmitted in the communication cycle from the control device to the signal units connected to the second subordinate data path,
wherein the assignment module is configured to assign, during the communication cycle, the first portion of the first output data to the first subordinate interface and the first portion of the second output data to the second subordinate interface,
wherein the communication module is configured to send, during the communication cycle, the first portion of the first output data via the first subordinate interface and the first portion of the second output data via the second subordinate interface,
wherein the reception module is configured to receive, during the communication cycle and after the reception of the first portions of the first and second output data, a second portion of the first output data and a second portion of the second output data,
wherein the assignment module is configured to assign, during the communication cycle, the second portion of the first output data to the first subordinate interface and the second portion of the second output data to the second subordinate interface,
wherein the communication module is configured to send, during the communication cycle, the second portion of the first output data via the first subordinate interface immediately subsequently to the first portion of the first output data, and the second portion of the second output data via the second subordinate interface immediately subsequently to the first portion of the second output data.

22. The network module according to claim 21,
wherein the network module comprises a timer module,
wherein the timer module is configured to provide, during the communication cycle, the first output data and the second output data with a piece of time information in order to synchronize the signal units of the first subordinate data path and the signal units of the second subordinate data path to a common time base.

23. The network module according to claim 22,
wherein the network module comprises a synchronization module, wherein the synchronization module is connected to the timer module and configured to prescribe the piece of time information during the communication cycle,
wherein the synchronization module is connectable to a synchronization module of a further network module and configured to match, during the communication cycle, the piece of time information to a further piece of time information prescribed by the further synchronization module.

* * * * *